(12) United States Patent
Dahl et al.

(10) Patent No.: US 11,593,438 B2
(45) Date of Patent: *Feb. 28, 2023

(54) GENERATING THEME-BASED FOLDERS BY CLUSTERING DIGITAL IMAGES IN A SEMANTIC SPACE

(71) Applicant: Adobe Inc., San Jose, CA (US)

(72) Inventors: Jonas Dahl, Basel (CH); Sudheer Tumu, Santa Clara, CA (US); Nithyanand Kota, Santa Clara, CA (US); Mihir Naware, Redwood City, CA (US); Maneesh Dewan, Sunnyvale, CA (US); Jatin Chhugani, Mountain View, CA (US); Ganesh Satish Mallya, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/314,651

(22) Filed: May 7, 2021

(65) Prior Publication Data
US 2021/0263970 A1   Aug. 26, 2021

Related U.S. Application Data

(63) Continuation of application No. 16/417,232, filed on May 20, 2019, now Pat. No. 11,030,257.

(51) Int. Cl.
*G06F 16/906* (2019.01)
*G06N 3/02* (2006.01)
(Continued)

(52) U.S. Cl.
CPC .......... *G06F 16/906* (2019.01); *G06F 16/166* (2019.01); *G06F 16/168* (2019.01); *G06N 3/02* (2013.01); *G06V 10/48* (2022.01)

(58) Field of Classification Search
None
See application file for complete search history.

(56) References Cited

U.S. PATENT DOCUMENTS 8,909,563 B1 * 12/2014 Jing ..................... G06N 20/10
706/22
9,129,179 B1 * 9/2015 Wong ................... G06F 16/583
(Continued)

OTHER PUBLICATIONS

Mikolov, Tomas; Sutskever, Ilya; Chen, Kai; Corrado, Greg S.; Dean, Jeff, Distributed Representations of Words and Phrases and Their Compositionality, NIPS 2013.
(Continued)

*Primary Examiner* — Justin S Lee
(74) *Attorney, Agent, or Firm* — Keller Preece PLLC

(57) ABSTRACT

The present disclosure relates to systems, methods, and non-transitory computer readable media for clustering media items in a semantic space to generate theme-based folders that organize media items by content theme. In particular, the disclosed systems can access media items that are stored in an original folder structure. The disclosed systems can generate content-based tags for each media item in a collection of media items. Based on the generated tags, the disclosed systems can map the collection of media items to a semantic space and cluster the collection of media items. The disclosed systems determine themes for the clusters based on the generated tags. The disclosed systems can present a media item navigation graphical user interface comprising the collection of media items organized by themes. The disclosed system can present the media item navigation graphical user interface without altering the original folder structure.

20 Claims, 17 Drawing Sheets

(51) Int. Cl.
*G06F 16/16* (2019.01)
*G06V 10/48* (2022.01)

(56) References Cited

U.S. PATENT DOCUMENTS

| | | | |
|---|---|---|---|
| 10,242,034 | B1 | 3/2019 | Li et al. |
| 11,048,744 | B1* | 6/2021 | Hohwald ................ G06F 16/51 |
| 2007/0038938 | A1 | 2/2007 | Canora et al. |
| 2008/0298766 | A1 | 12/2008 | Wen et al. |
| 2009/0157847 | A1 | 6/2009 | Shibata |
| 2014/0279039 | A1 | 9/2014 | Systrom |
| 2015/0143236 | A1 | 5/2015 | Tena Rodriguez et al. |
| 2015/0206070 | A1 | 7/2015 | Kulkarni et al. |
| 2016/0117574 | A1* | 4/2016 | Mei ....................... G06F 16/583 |
| | | | 382/159 |
| 2016/0379091 | A1 | 12/2016 | Lin et al. |
| 2017/0228615 | A1* | 8/2017 | Chavez ................ G06K 9/6255 |
| 2017/0262479 | A1 | 9/2017 | Chester et al. |
| 2018/0096208 | A1 | 4/2018 | Matsumoto |
| 2018/0150444 | A1 | 5/2018 | Kasina |
| 2018/0212904 | A1 | 7/2018 | Smullen et al. |
| 2018/0249193 | A1 | 8/2018 | Zhang et al. |
| 2018/0267997 | A1 | 9/2018 | Lin et al. |
| 2018/0285459 | A1 | 10/2018 | Soni et al. |
| 2019/0012714 | A1 | 1/2019 | Bright |
| 2019/0286715 | A1 | 9/2019 | Zhao et al. |
| 2019/0354609 | A1 | 11/2019 | Huang et al. |
| 2020/0050895 | A1 | 2/2020 | Bhattacharjee et al. |
| 2020/0134058 | A1 | 4/2020 | Liu et al. |
| 2020/0175095 | A1* | 6/2020 | Morariu ............... G06V 30/414 |
| 2020/0278997 | A1 | 9/2020 | Lamere et al. |

OTHER PUBLICATIONS

U.S. Appl. No. 16/417,232, Aug. 17, 2020, Preinterview 1st Office Action.
U.S. Appl. No. 16/417,232, Dec. 16, 2020, Office Action.
U.S. Appl. No. 16/417,232, Feb. 12, 2021, Notice of Allowance.

* cited by examiner

GENERATING THEME-BASED FOLDERS BY CLUSTERING DIGITAL IMAGES IN A SEMANTIC SPACE

CROSS REFERENCE TO RELATED APPLICATIONS

The present application is a continuation of U.S. application Ser. No. 16/417,232, filed on May 20, 2019. The aforementioned application is hereby incorporated by reference in its entirety.

BACKGROUND

With the rapid growth of the Internet, people are gaining access to increasing amounts of digital media. For example, media items such as images, video, audio clips, and other media types can be aggregated into a digital space. The digital space often contains unwieldly amounts of media items; thus, they are often organized by grouping sets of media items using intricate folder structures. For example, images might be stored in folders based on file type, upload date, event, or any other category. Media item storage can also include presenting graphical user interfaces that reflect folder structure organization in the digital space to facilitate user search and browsing.

As such, users typically use conventional digital content systems to search and browse repositories of media items. Conventional digital content systems often utilize features such as search functions and organized folders. Although conventional digital content systems can create different folder structures to store media items, they suffer from a number of technical shortcomings in relation to flexibility, efficiency, and accuracy. Some conventional digital content systems allow a search function to facilitate finding a particular media item or navigation of the folders storing the media items. However, these conventional digital content systems are often inflexible. For example, conventional digital content systems with search functions are often limited to utilizing broad pre-defined categories (e.g., selfies, landscapes, location). Although this function may often suffice for consumer use, these organization methods and search functions often fail to cover the broad range of image categories present in enterprise repositories (e.g., an organization's inventory of all media items). For example, searching enterprise repositories using only a pre-defined category (e.g., landscape) will often yield vast quantities of search results. Additionally, if a user enters an unrecognizable or unprecise search term, conventional digital content systems often fail to retrieve accurate results. Thus, the intricate folder structures utilized by most conventional digital content systems are not scalable to enterprise repositories that include massive amounts of media items.

Indeed, conventional digital content systems often dedicate a significant amount of processing power, time, storage, and other computer resources to store, access, and retrieve particular media items. Conventional digital content systems that store enterprise repositories often utilize folder structures based on user defined categories of organization. Because of this type of organization, a particular media item that has been used once and stored is often practically inaccessible to a user that cannot identify or remember the defined category for the media item. For example, a user who has created a date-based folder structure must often know the date a particular media item was stored in order to retrieve the media item. Additionally, because conventional digital content systems often fail to provide ways to locate media items with particular content, users are often required to create new media items rather than access existing items. Thus, excessive storage space is often dedicated to one-time use media items. In addition to requiring more storage space, conventional systems can also incur a cost in the form of longer time to market. In particular, conventional systems often require significant time to find relevant assets or can require creation of a new asset due to the inability to locate a relevant existing asset.

Additionally, conventional digital content systems often present cumbersome user interfaces. For example, a user trying to compile media items that include particular content is often required to drill through multiple layers. In particular, a user many be required to open a first folder, select the content in the first folder, close the folder, and search the next folder.

Conventional digital content systems are also often inaccurate. In particular, conventional digital content systems often only present a final set of search results based on a single search. In particular, search results provided by conventional digital content systems are often either too broad or too narrow. For example, a conventional system may return an extensive and unorganized list of media items that include the desired category of media items in addition to irrelevant media items. Even if a user identifies the ideal combination of keywords to apply to a search, the results presented by conventional digital content systems will often present overly-narrow results that fail to include media items that may be relevant to the user's search.

Furthermore, the foregoing problems are exacerbated in enterprise repositories that may have millions of media items and add hundreds of thousands of assets a day. These along with additional problems and issues exist with regard to organizing and retrieving media items in digital content repositories.

SUMMARY

Embodiments of the present invention comprise systems, methods, and computer-readable media that can automatically generate meaningful theme-based folders for media items in a repository based on the content of the media items and expose the theme-based folder structure to a user. As a result, when a user searches for a content in a repository of digital items, the systems, methods, and computer-readable media intelligently can present theme-based folders that include the searched content and related sub-folders to refine the search. In particular, the disclosed systems can analyze media items in a digital repository to identify content-based tags for the media items. The disclosed systems can generate semantic feature vectors for the media items based on the generated tags. In at least one embodiment, the disclosed systems can use a trained neural network to generate the semantic feature vectors. Additionally, the disclosed systems can cluster the media items to reveal distinct themes. The disclosed systems can present theme-based folders in which media items are organized based on the revealed themes.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
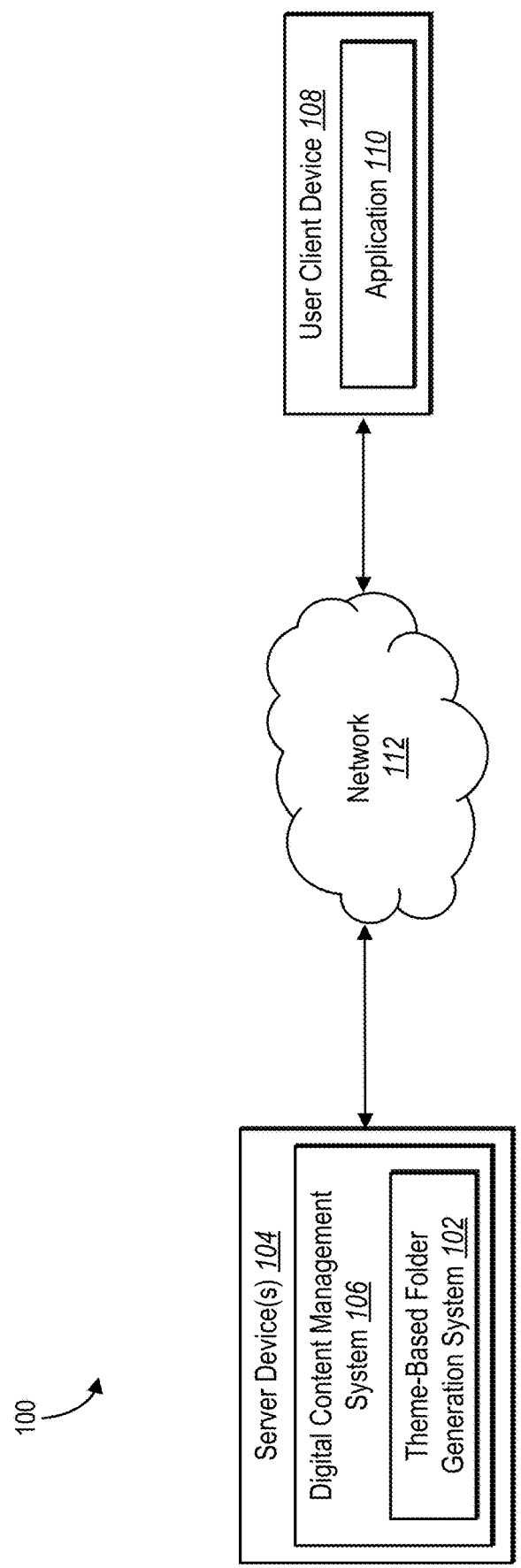
FIG. 1 illustrates an example environment for implementing a theme-based folder generation system in accordance with one or more embodiments.

One or more embodiments of the present disclosure include a theme-based folder generation system that groups media items into meaningful categories and surfaces the media items in theme-based folders. In particular, the theme-based folder generation system can generate content-based tags for each media item in a repository. The theme-based folder generation system can project all the media items into a vector embedding space based on the content-based tags. The theme-based folder generation system can run a cluster analysis in the vector embedding space to group semantically related or similar media items. The theme-based folder generation system can inspect each cluster to determine human-understandable themes for each of the identified clusters and generate a corresponding theme-based folder for identified clusters. The theme-based folder generation system can present the generated theme-based folders with their associated human-understandable themes at a client device associated with a user.

To illustrate, in one or more embodiments, the theme-based folder generation system can analyze the content of media items (e.g., images, video, audio files) in a collection of media items and generate tags for each media item. The theme-based folder generation system can map the collection of media items to a semantic space based on the generated tags. More specifically, the theme-based folder generation system can generate semantic feature vectors for each of the media items in the collection of media items. Additionally, the theme-based folder generation system can cluster the semantic feature vectors in the semantic space. The theme-based folder generation system can inspect each cluster to extract human-understandable themes or topics from each cluster. The theme-based folder generation system can use the themes to generate a theme-based folder structure in which media items within the structure are organized by theme. The theme-based folder generation system can generate a graphical user interface that presents the theme-based folders at a client device. The graphical user interface can also include search and browse functions.

As just mentioned, the theme-based folder generation system can use content-based tags to identify categories or themes in a collection of media items. The theme-based folder generation system can associate tags that indicate content in a media item. In particular, the theme-based folder generation system can utilize one or more tagging mechanisms to generate tags for media items in a collection. Additionally, the theme-based folder generation system can utilize different tag vocabularies to offer different organizations of the same set of media items. The theme-based folder generation system can project the tags into semantic feature vectors and map them into a semantic space. The theme-based folder generation system can run a cluster analysis on the mapped semantic feature vectors to reveal semantic clusters or categories. Because the theme-based folder generation system identifies categories based on tags, the theme-based folder generation system can generate themes based on the content of the media items stored within the collection of media items depending on the chosen tag vocabulary.

Additionally, the theme-based folder generation system can recursively cluster the mapped semantic feature vectors. In particular, the theme-based folder generation system can further parse sub-clusters within a cluster to identify sub-categories or sub-themes within a category or theme. The theme-based folder generation system can assign media items to each cluster and sub-cluster and associate each cluster and sub-cluster with a human-understandable theme. The theme-based folder generation system can create a theme-based folder for each human-understandable theme. By recursively identifying clusters and scoring media items to the clusters, the theme-based folder generation system can break down large media item repositories in steps. Thus, the theme-based folder generation system can create an intuitive content-based folder structure that drills down from general categories into more specific categories.

The theme-based folder generation system can generate an intuitive media item navigation graphical user interface that presents the collection of theme-based folders. In addition to providing an interface that enables users to navigate the theme-based folder structure, the theme-based folder generation system can also provide a search function in the media item navigation graphical user interface. For example, the theme-based folder generation system can receive a semantic search term. The theme-based folder generation system can access a reverse index of content-based tags and media items to retrieve media items that match the semantic search term. Additionally, the theme-based folder generation system can present the retrieved media items in theme-based search folder organized in order of relevance. Thus, the theme-based folder generation system can provide context to search results by use of theme-based folders. Thus, as explained in greater detail below, the theme-based folder generation system can present a media item navigation graphical user interface that presents an impactful hybrid between search and exploration.

In addition to the foregoing, the theme-based folder generation system can update the clustering and theme-based folder generation as new assets are added to the repository, daily, weekly, or in response to another trigger. As such, the theme-based folder generation system can change the themes of the theme-based folders as the collection of media assets changes. Thus, the theme-based folder generation system can provide a fluid folder system that changes and adapts based on the media items managed thereby.

Furthermore, in one or more embodiments, the theme-based folder generation system can operate in a flat storage environment. In other words, the theme-based folder generation system can allow the media items to be stored in a single location or folder and employ machine learning to make search and browsing easy and efficient. This is in contrast to conventional static hierarchal structures in which media items are stored in different layers of folders and subfolders. Thus, while the theme-based folder generation system can surface different layers of theme-based folders (e.g., theme-based folders and sub-folders), the actual media items can be stored in the same flat storage location or in existing hierarchical folder structures.

The theme-based folder generation system provides several advantages over conventional systems. For example, the theme-based folder generation system can improve the flexibility of search functions relative to conventional systems. For instance, unlike conventional digital content systems, the theme-based folder generation system is not limited to sorting media items to limited pre-defined categories. Rather, the theme-based folder generation system identifies categories based on content-based tags generated for the media items. As such, each theme-based folder structure is customized to the media items therein. This flexible approach is in contrast to conventional methods that typically organize based on pre-defined categories. Indeed, the theme-based folder generation system can identify a broad range of categories within a collection of media items based on the detected content within the collection of media items. The theme-based folder generation system can thus improve the flexibility of search functions for both personal use and also enterprise repositories.

Additionally, the theme-based folder generation system can improve computer efficiency relative to conventional digital content systems. For example, unlike conventional digital content systems, the theme-based folder generation system provides an intuitive media item navigation graphical user interface. In particular, the theme-based folder generation system enables a user to identify media items containing desired content or themes using an intuitive hybrid search and browse function. For example, rather than requiring a user to browse through multiple folders to identify media items containing particular content, the theme-based folder generation system can search a collection of media items for the particular content. The theme-based folder generation system can present, to the user, media items with the identified content or theme.

The theme-based folder generation system also makes improvements to accuracy relative to conventional digital content systems. In particular, the theme-based folder generation system can organize a theme-based folder structure that includes subfolders with progressing content specificity. For example, because the theme-based folder generation system can recursively identify categories within a collection of media items, the theme-based folder generation system yields search results that are neither too broad nor too narrow. Additionally, because the theme-based folder generation system maps semantic feature vectors to a semantic space, the theme-based folder generation system can map distances between the semantic feature vectors and cluster centroids. The theme-based folder generation system can use the measured distances to list media items in order of relevance to themes. By mapping the semantic feature vectors to the semantic space, the theme-based folder generation system can also retrieve similar or like media items even if the media items do not exactly match a search term. Thus, the theme-based folder generation system improves accuracy relative to conventional digital content systems.

As illustrated by the foregoing discussion, the present disclosure utilizes a variety of terms to describe features and benefits of the theme-based folder generation system. Additional detail is hereafter provided regarding the meaning of these terms as used in this disclosure. For example, as used herein, the term "media item" refers to any item in digital media form. In particular, media item can include digital images, digital video, digital audio, digital text, or other types of digital content. Additionally, media items can include stock images, promotional videos, music, and other digital content stored in an enterprise repository. In particular, media items can be stored, organized, and retrieved based on content of the media items.

As used herein, the term "tag" refers to information attached to digital content. In particular, tag can refer to a descriptive label attached to a media item. For example, tags can include meaningful labels that are attached to media items based on the content of the media items. Tags can include terms and words that describe content in a media item. For example, various tagging systems can generate multiple tags for a media item of a collection of media items.

As used herein, the term "collection of media items" refers to a group media items. In particular, collection of media items can refer to a collection of media items stored at a single digital or physical location. For example, a collection of media items can refer to an organization's inventory of all media items including images, videos, music, and other digital content.

As used herein, the term "semantic space" refers to a high dimensional space. In particular, semantic spaces can comprise spaces into which semantic feature vectors can be mapped. In the semantic space, distance between semantic feature vectors can indicate semantic similarity. Additionally, distances between semantic features can be measured within the semantic space to determine semantic similarity between semantic feature vectors.

As used herein, the term "cluster" refers to a group of objects positioned closely together. For example, a cluster can include semantic feature vectors. More particularly, cluster can refer to a group of similar semantic feature vectors that are in closer proximity to each other than to other semantic feature vectors. A cluster can also include media items, and a cluster of media items can be presented as a theme-based folder at a user client device.

As used herein, the term "theme" (or "human-understandable theme") refers to a topic or category. In particular, a theme can be a human-understandable word that expresses common semantics of a group of media items. For example, a cluster of media items can be associated with a theme.

Additionally, media items can be organized by theme or grouped based on semantic similarities.

Additional detail regarding the theme-based folder generation system will now be provided with reference to the figures. For example, FIG. 1 illustrates a schematic diagram of an example environment 100 for implementing a theme-based folder generation system 102 in accordance with one or more embodiments. An overview of the theme-based folder generation system 102 is described in relation to FIG. 1. Thereafter, a more detailed description of the components and processes of the theme-based folder generation system 102 is provided in relation to the subsequent figures.

As shown in FIG. 1, the environment 100 includes server device(s) 104, a user client device 108 and a network 112. Each of the components of the environment can communicate via the network 112, any suitable network over which computing devices can communicate. Example networks are discussed in more detail below in relation to FIG. 13.

As shown in FIG. 1, the environment 100 includes the server device(s) 104. The server device(s) 104 may generate, store, receive, and transmit electronic data, such as digital video, digital images, digital audio, metadata, etc. The server device(s) 104 may receive data from the user client device 108. For example, the server device(s) 104 may gather and/or receive media items, item usage data, search requests, and other data. The server device(s) 104 can communicate with the user client device 108 via the network 112. For example, the server device(s) 104 can send media items organized by theme in theme-based folders to the user client device 108. In some embodiments, the server device(s) 104 comprises a content server. The server device(s) 104 can also comprise an application server, a communication server, a web-hosting server, a social networking server, or a digital content management server.

As shown in FIG. 1, the server device(s) 104 can include the digital content management system 106. The digital content management system 106 facilitates creating, modifying, editing, sharing, distributing, and/or managing digital content, including web sites or other interactive digital content. For example, the digital content management system 106 can store a repository of media items, including digital images, digital videos, digital audio, data graphics, text data, other media items, and associated metadata received from the user client device 108. Moreover, the digital content management system 106 can receive search requests from the user client device 108 including content-specific search terms. In addition, the digital content management system 106 can distribute digital content (e.g., digital media or digital advertisements) to the user client device 108 (e.g., via an application or website accessed by the user client devices 108).

As shown, the theme-based folder generation system 102 can be implemented as part of the digital content management system 106. The theme-based folder generation system 102 can cluster media items in a semantic space to generate theme-based folders that organize media items. The theme-based folder generation system 102 can communicate with the user client device 108. The theme-based folder generation system 102 can receive digital content from the user client device 108 including media items. Additionally, the theme-based folder generation system 102 can distribute (e.g., via the network 112) data relating to the theme-based folders and media items located in the theme-based folders. For example, the theme-based folder generation system 102 can provide the media items organized by theme to the user client device 108.

The theme-based folder generation system 102 can comprise an application running on the server device(s) 104 or a portion of a software application that can be downloaded from the server device(s) 104. For example, the theme-based folder generation system 102 can include a web hosting application that allows the user client device 108 to interact with the digital content hosted on the server device(s) 104. To illustrate, in one or more embodiments of the environment 100, the user client device 108 accesses a web page supported by the server device(s) 104. In alternative embodiments, the user client device 108 downloads the theme-based folder generation system 102, which then runs on the user client device 108.

As illustrated in FIG. 1, the environment 100 includes the user client device 108. the user client device 108 can generate, store, receive, and send digital data. In particular, the user client device 108 can send media items including digital images, video, audio, and text to the server device(s) 104 via the network 112. The user client device 108 can present, to the user, media items organized by meaningful themes. Additionally, a user associated with the user client device 108 can input search parameters into the user client device 108.

The user client device 108 may comprise various types of client devices. For example, in some embodiments, the user client device 108 includes mobile devices such as laptops, tablets, mobile telephones, smartphones, etc. In other embodiments, the user client device 108 includes non-mobile devices, such as desktops or servers, or other types of client devices. Additional details with regard to the user client device 108 are discussed below with respect to FIG. 13.

As illustrated in FIG. 1, the user client device 108 includes an application 110. The application 110 may be a web application or a native application on the user client device 108 (e.g., a mobile application, a desktop application, etc.). The application 110 can interface with the theme-based folder generation system 102 to provide digital content to the server device(s) 104. Indeed, the application 110 can receive data from the theme-based folder generation system 102 and can present, for display at a user interface that includes media items organized by theme.

The digital content management system 106 stores a repository of digital content, including digital images, digital videos, data graphics, and digital text (e.g., digital content received from the user client device 108). Indeed, the digital content management system 106 can cluster media items and determine themes for the clusters. Additionally, the digital content management system 106 can distribute digital content organized by theme for display to a client device (e.g., the user client device 108).

Although FIG. 1 depicts the theme-based folder generation system 102 located on the server device(s) 104, in some embodiments, the theme-based folder generation system 102 may be implemented by (e.g., located entirely or in part) on one or more other components of the environment. For example, the theme-based folder generation system 102 may be implemented entirely on the user client device 108. In which instances, the server device(s) 104 and/or the user client device can have the media items stored thereon.

Additionally, the user client device 108 can communicate directly with the theme-based folder generation system 102, bypassing the network 112. Moreover, the theme-based folder generation system 102 can include one or more databases (e.g., a digital content database) housed on the server device(s) 104 or elsewhere in the environment. Further, the theme-based folder generation system 102 can include one or more machine learning models (e.g., neural networks), and the theme-based folder generation system 102 can be implemented in a variety of different ways across the server device(s) 104, the network 112, and the user client device 108.

Figure 2A:
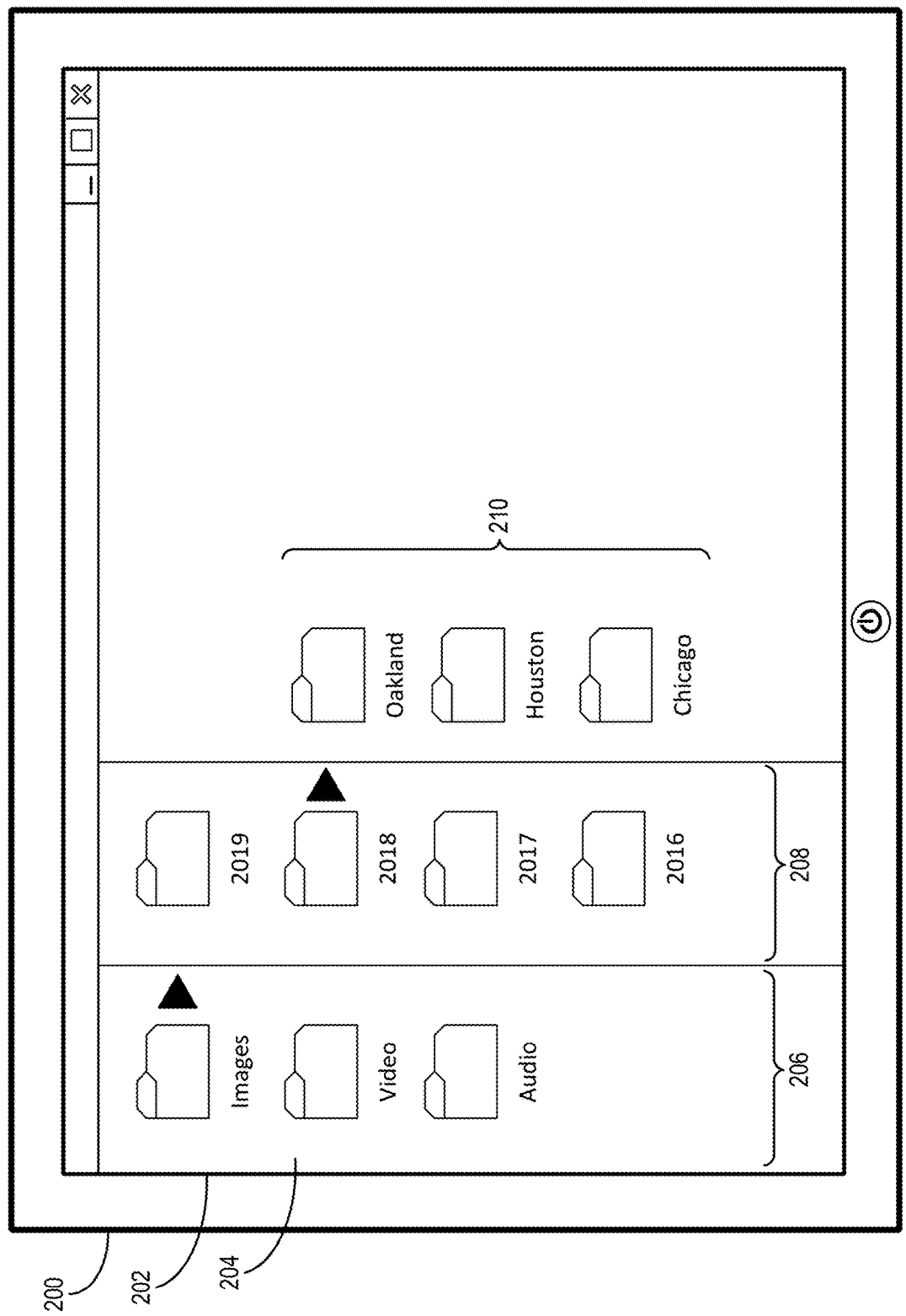
FIG. 2A illustrates a graphical user interface organizing media items a conventional organizational folder structure.
Figure 2B:
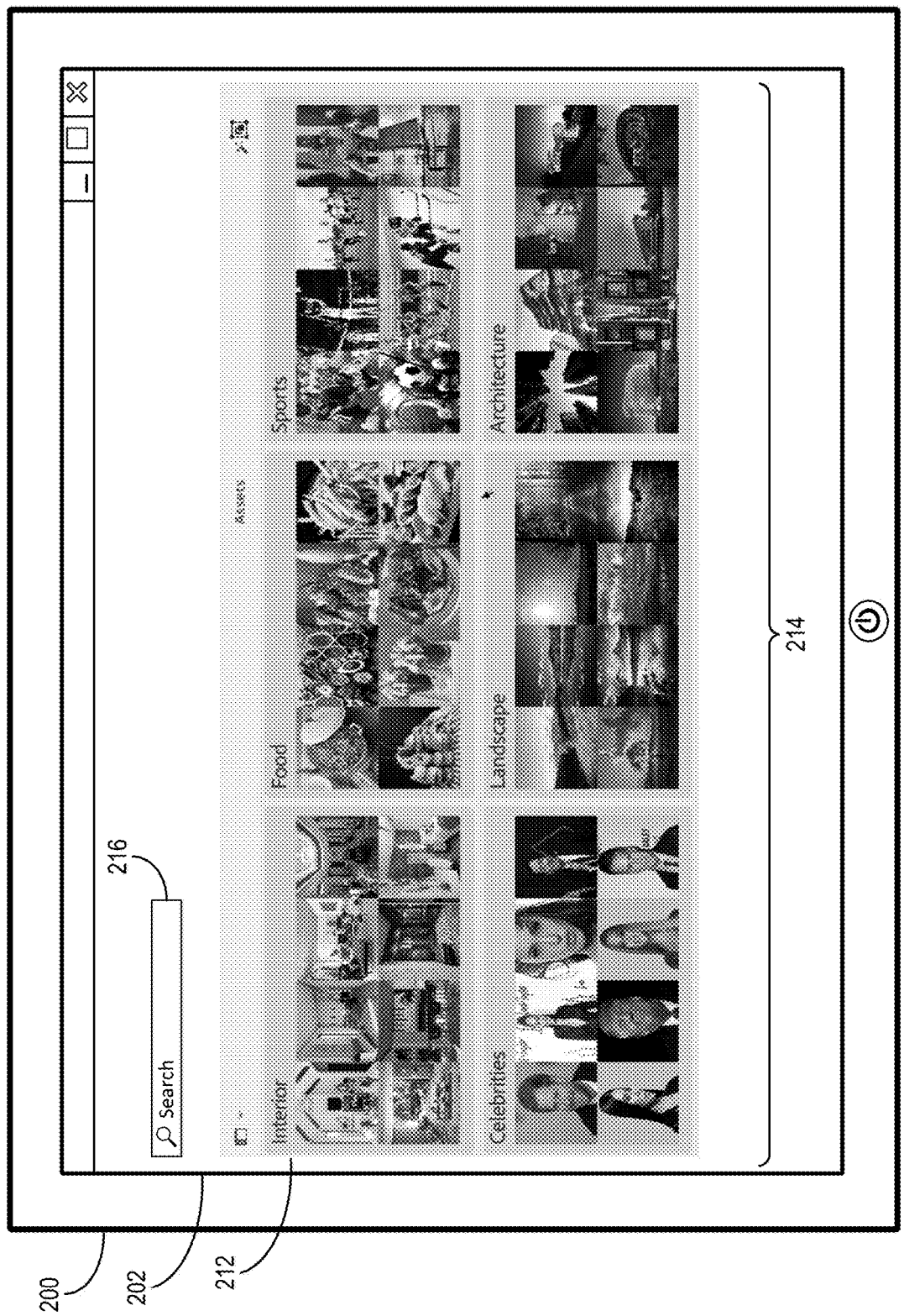
FIG. 2B illustrates a graphical user interface in which the media items are organized into a theme-based folder structure in accordance with one or more embodiments.

As discussed above, the theme-based folder generation system 102 clusters media items in a semantic space to generate theme-based folders that organize the media items. FIGS. 2A-2B provide an example of an organizational folder structure storing media items and an example theme-based folder structure used to organize the media items based on theme. FIG. 2A illustrates an organizational file structure in which media items are stored. FIG. 2B illustrates a searchable theme-based folder structure in which media items are organized without altering the existing organizational file structure.

As just mentioned, FIG. 2A illustrates an example organizational folder structure for a collection of media items. As shown in FIG. 2A, the theme-based folder generation system 102 presents an organizational structure interface 204 via a display screen 202 of a computing device 200. As illustrated, the organizational structure interface 204 includes folders and subfolders that organize digital content. FIG. 2A illustrates root folders 206, folders 208, and subfolders 210. The root folders 206, folders 208, and subfolders 210 are each on different levels of a hierarchical folder structure.

As illustrated by FIG. 2A, a user associated with the computing device 200 can organize media items using the organizational structure interface 204. A user or organization can organize media items in existing organizational file structures using various methods. For example, as illustrated by the root folders 206 of FIG. 2A, a user or organization can organize media items by type of file (e.g., images, video, audio). The user or organization can also sort media items by date (e.g., the folders 208 are organized by year) or by location (e.g., the subfolders 210 are organized by city).

A user of the computing device 200 can locate a media item using the organizational structure interface 204 if the user knows the organizational traits of the media item. However, it can be difficult to impossible to identify media items that include particular content if the user cannot identify organizational traits of the media items. Additionally, if the user would like to compile media items of a particular topic or theme, the user must search through the root folders 206, the folders 208, and the subfolders 210 in order to compile the media items. The theme-based folder generation system 102 presents an alternative media item navigation graphical user interface that organizes media items by theme that can function without altering the existing organizational file structure.

As discussed above, the theme-based folder generation system 102 can toggle between displaying media items organized using the existing organizational file structure and a theme-based folder structure. As illustrated in FIG. 2B, the theme-based folder generation system 102 presents a media item navigation interface 212 via the display screen 202 of the computing device 200. As illustrated, the media item navigation interface 212 includes theme-based folders 214 and search query element 216.

As shown in FIG. 2B, the theme-based folder generation system 102 can automatically create meaningful folder structures based on the content of the media items. In particular, the theme-based folder generation system 102 compiles media items with shared themes into the corresponding theme-based folders 214. For example, as illustrated, the theme-based folders 214 includes theme-based folders for interior, food, sports, and others. The theme-based folder generation system 102 can generate theme-based folders for contextual themes. For example, the theme-based folder generation system 102 might categorize media items in additional theme-based folders including machines, cities, the environment, etc. Methods for determining the themes will be discussed in additional detail below.

As illustrated in FIG. 2B, the theme-based folder generation system 102 groups media items into meaningful categories (i.e., interior, food, sports) and surfaces the media content items using the theme-based folders 214. In one or more embodiments, the theme-based folder generation system 102 does note revise or modify the existing organizational file structure but rather allow for an improved interface for exploring/browsing the media items. Thus, the theme-based folder generation system 102 offers a more intuitive view into large repositories of media items without disrupting established workflows.

Additionally, the theme-based folder generation system 102 can recursively break down large media item repositories in levels. In particular, based on detecting user interaction with a theme-based folder of the theme-based folders 214, the theme-based folder generation system 102 can update the media item navigation interface 212 to include theme-based subfolders including subcategories that are related to the selected theme-based folder category. For example, based on detecting a user selection of the theme-based folder 214 for food, the theme-based folder generation system 102 can update the media item navigation interface 212 to present additional theme-based subfolders that includes subcategories of food (e.g., fried, seafood, Italian, dairy, dessert, etc.). As will be discussed in additional detail below, the theme-based folder generation system 102 can continue to generate theme-based subfolders that allow the user to incrementally explore or search narrower categories.

As illustrated in FIG. 2B, the media item navigation interface includes the search query element 216. In particular, and as will be discussed in additional detail below, the theme-based folder generation system 102 can receive search terms in the search query element 216. The theme-based folder generation system 102 can apply a search function along with the above mentioned theme-based folder structure to enable users to locate media items using a combination of search and content-driven browsing. For example, based on receiving a search term input in the search query element 216, the theme-based folder generation system 102 can display the theme-based folder associated with a match for the search term or a closest matching term. Alternatively, the theme-based folder generation system 102 can identify search results, cluster the search results, and organize the search results in custom generated theme-based folders.

Figure 3:
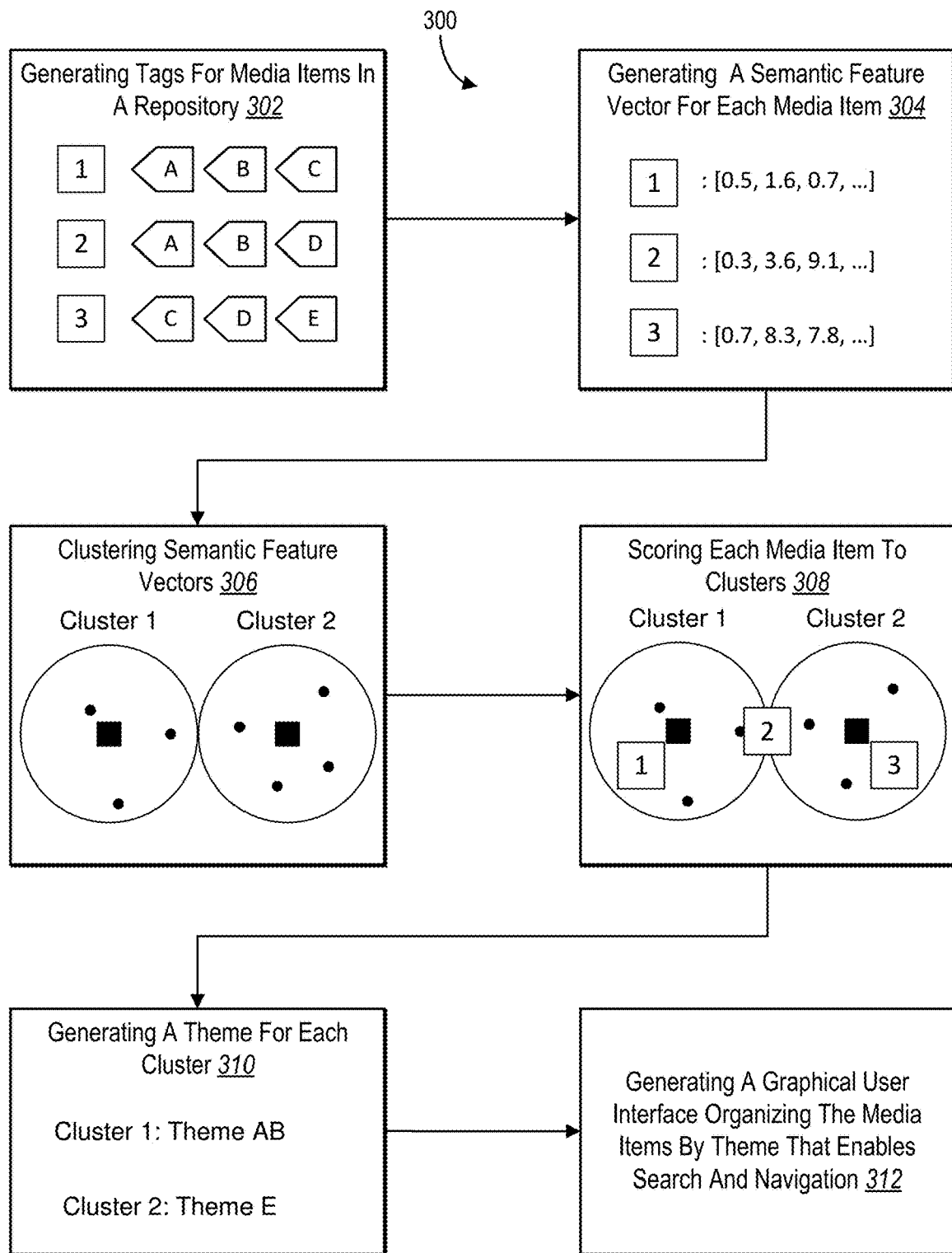
FIG. 3 illustrates an overview of a process of generating theme-based folders organizing media items in accordance with one or more embodiments.

As mentioned above, the theme-based folder generation system 102 can organize media items by contextual themes. FIG. 3 provides a general overview of how the disclosed theme-based folder generation system 102 organizes media items by theme in one or more embodiments. In particular, FIG. 3 illustrates a series of acts 300 that include the acts 302-312 of generating tags for media items, generating a semantic feature vector for each media item, clustering semantic feature vectors, scoring each media items to clusters, generating themes for each cluster, and generating a graphical user interface organizing the media items by theme. Each of these acts will be discussed in additional detail below. In alternative embodiments, one or more of acts 302-312 can be expanded, excluded, or otherwise modified.

As part of the series of acts 300, the theme-based folder generation system 102 generates tags for media items in a repository 302. In particular, as part of generating tags for media items, the theme-based folder generation system 102 can use an image tagger. The theme-based folder generation system 102 can use the image tagger to generate meaningful tags that describe the content (e.g., articles, placement, landmarks, composition features, emotional features, colors, styles, etc.) of each media item. For example, as illustrated in FIG. 3, the theme-based folder generation system 102 generates tags for each of media items 1, 2, and 3. As illustrated in the embodiment FIG. 3, the theme-based folder generation system 102 identifies content in media item 1 and associates tags A, B, and C with the first media item based on the identified content. The theme-based folder generation system 102 can repeat the process for media items 2 and 3.

As will be discussed in additional detail below, the theme-based folder generation system 102 can utilize various types of image taggers to generate tags for the media items in the repository. For example, the image tagger can generate tags based on similarity, machine learning or artificial intelligence classifier techniques, web searches, or other methods. In at least one embodiment, the theme-based folder generation system 102 can associate a classification confidence score with each tag. Tagging methods are discussed in additional detail below with respect to FIGS. 4-5.

As part of the series of acts 300, the theme-based folder generation system 102 can generate a semantic feature vector for each tagged media item 304. In at least one embodiment, the theme-based folder generation system 102 uses the collection of tags associated with each media item to generate a semantic feature vector representation for the media items. In additional embodiments, the theme-based folder generation system 102 uses the collection of tags and associated confidence scores to build semantic feature vectors representative of the media items. The generation of semantic feature vectors is described in greater detail below.

As illustrated in FIG. 3, the series of acts 300 also can include act 306 of clustering the semantic feature vectors. In particular, the theme-based folder generation system 102 can map the semantic feature vectors into a vector space and run one or more clustering algorithms on the semantic feature vectors to reveal distinct clusters. For example, the theme-based folder generation system 102 can use methods such as Latent Dirichlet Allocation and K-means clustering to identify clusters of semantic feature vectors in the semantic space. Each of these clustering methods will be discussed in greater detail below with respect to FIGS. 6A-6B and FIG. 7.

As illustrated in FIG. 3, the series of acts 300 can include the act of scoring each media item to clusters 308. In particular, the theme-based folder generation system 102 assigns media items to clusters. In at least one embodiment, the theme-based folder generation system 102 assigns media items to clusters based on their score against a thematic feature vector reaching a certain threshold. For example, as illustrated in FIG. 3, the theme-based folder generation system 102 assigns media item 1 to cluster 1, media item 3 to cluster 2, and media item 2 to both clusters 1 and 2. Additionally, a single media item can belong to multiple clusters or could be constrained to belong to a single best-suited cluster. Additional detail regarding scoring media items to clusters will be provided with relation to FIGS. 6A-6B and FIG. 7.

The series of acts 300 shown in the embodiment of FIG. 3 also includes the act 310 of generating a theme for each cluster. In particular, the theme-based folder generation system 102 can generate a human-understandable theme for each cluster. The theme-based folder generation system 102 can inspect each cluster and assign each cluster a human understandable theme. In at least one embodiment, the theme-based folder generation system 102 identifies tags associated with each media item in a cluster and assigns a human understandable theme based on the most frequently occurring tags. In at least one other embodiment, the theme-based folder generation system 102 assigns themes to each cluster using a manual process. In particular, the theme-based folder generation system 102 presents each cluster to a user and receives a human understandable theme as input for each cluster. As illustrated in embodiment of FIG. 3, the theme-based folder generation system 102 can associate the theme AB, which correlates with tags A and B, with the first cluster. The theme-based folder generation system 102 associates the theme E, associated with the tag E, with cluster 2. The act 310 of generating a human-understandable theme for each cluster will be discussed in greater detail below with respect to FIG. 8.

Figure 9A:
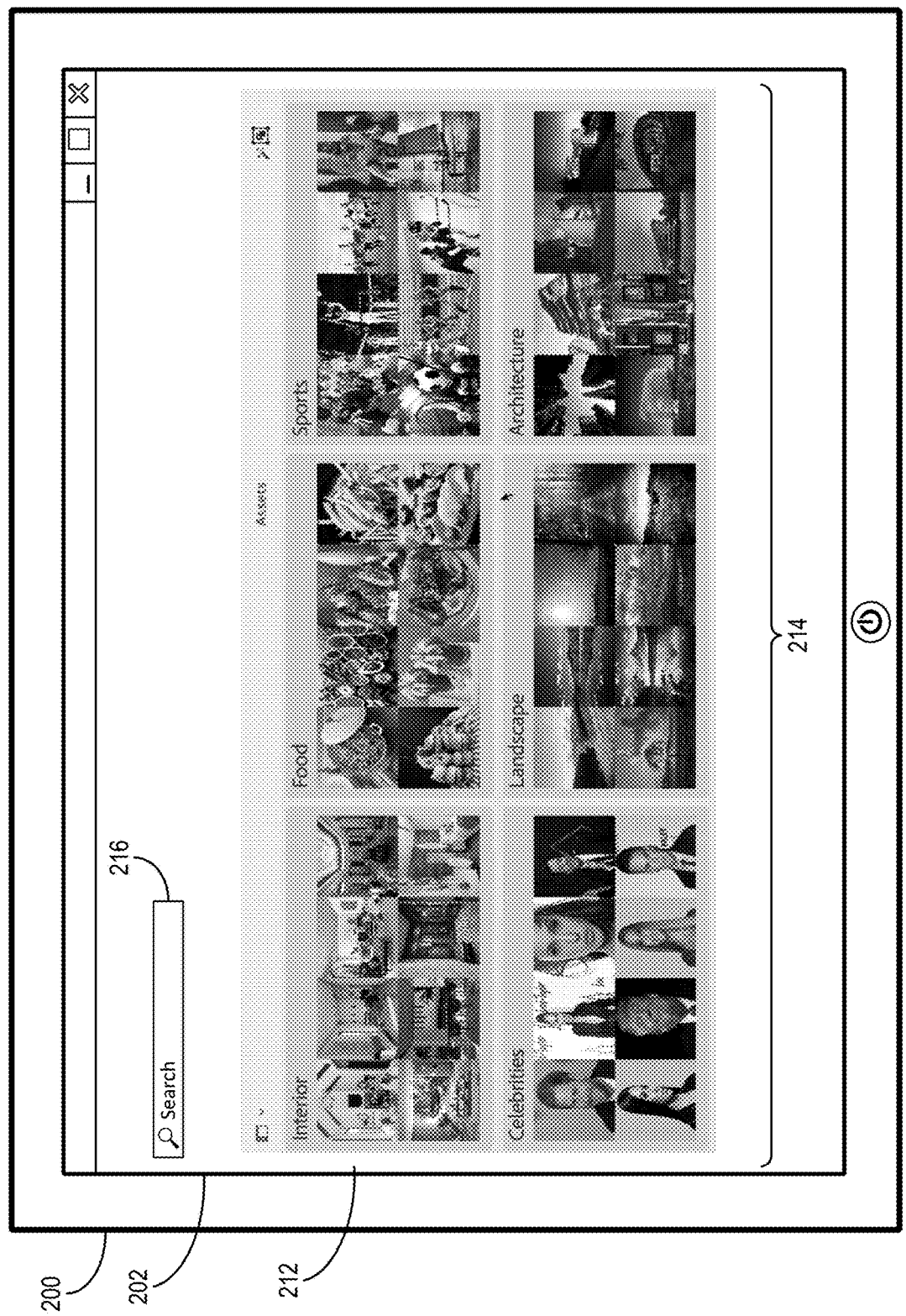
FIGS. 9A-9C illustrate a series of graphical user interfaces that present a collection of media items organized by theme-based folders in accordance with one or more embodiments.
Figure 9B:
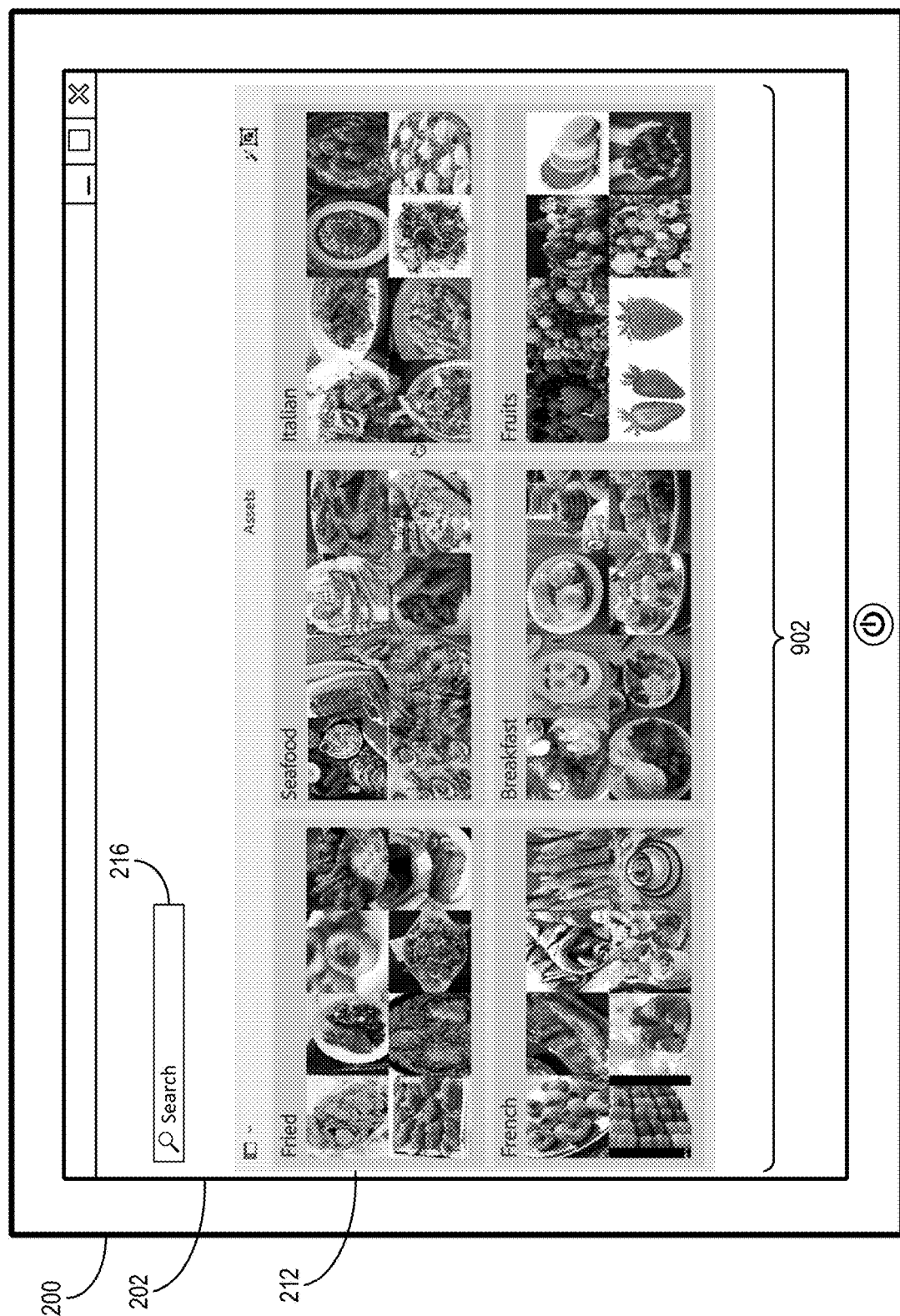
Figure 9C:
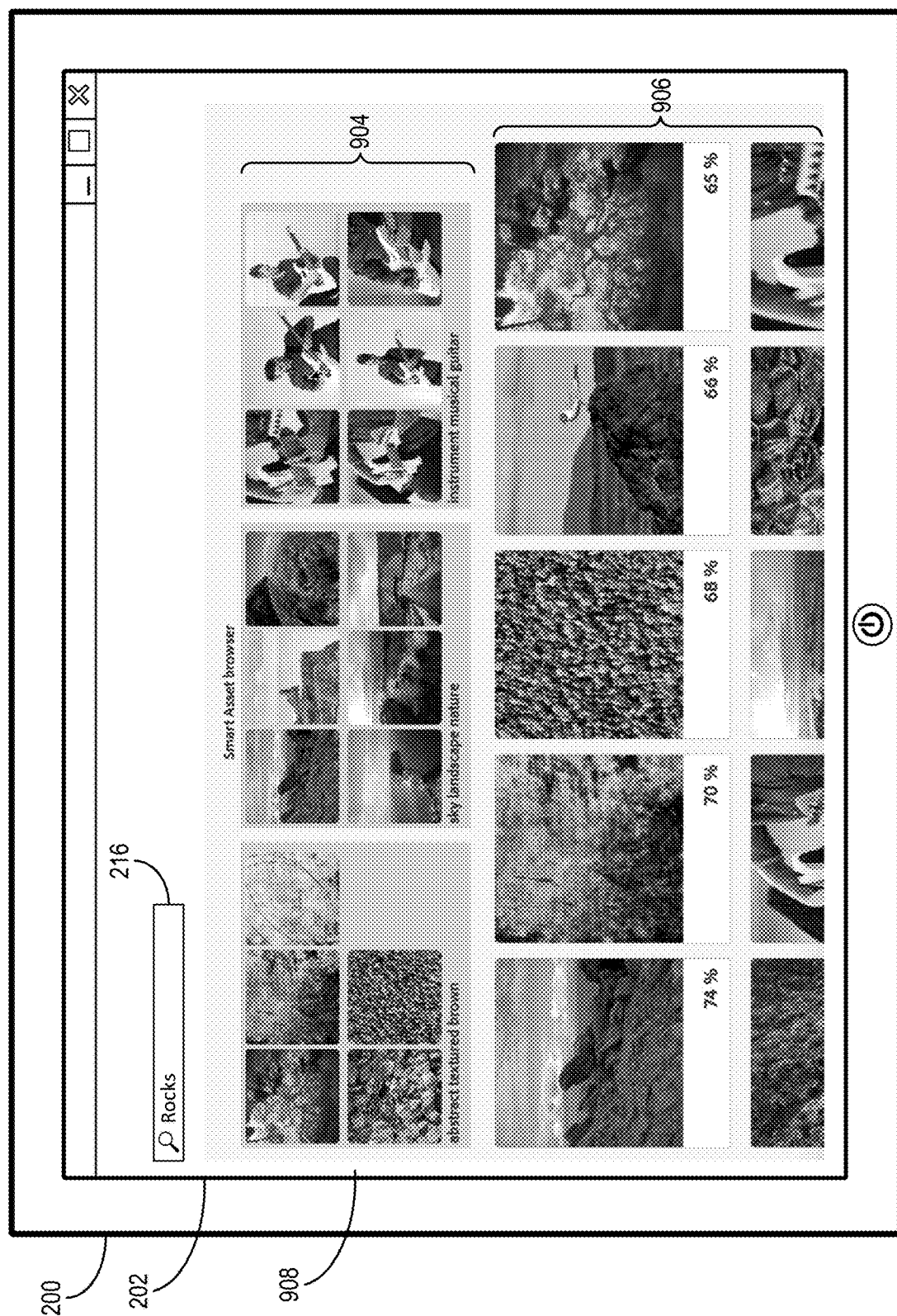

The series of acts 300 can also include act 312 of generating a graphical user interface organizing the media items by theme that enables search and navigation. In particular, the theme-based folder generation system 102 can present a graphical user interface that includes theme-based folders comprising the media items assigned to the clusters and their associated themes. The theme-based folder generation system 102 can present a media item navigation graphical user interface that includes theme-based folders that are organized by content and a search query element. The theme-based folder generation system 102 can combine the theme-based folder browsing function with a search function to create an impactful hybrid between content-driven search and navigation. FIGS. 9A-9C below provide additional detail regarding the graphical user interfaces presented by the theme-based folder generation system 102. The discussion provided below in relation to FIG. 10 includes additional detail regarding the theme-based folder generation system 102 search function.

Figure 4:
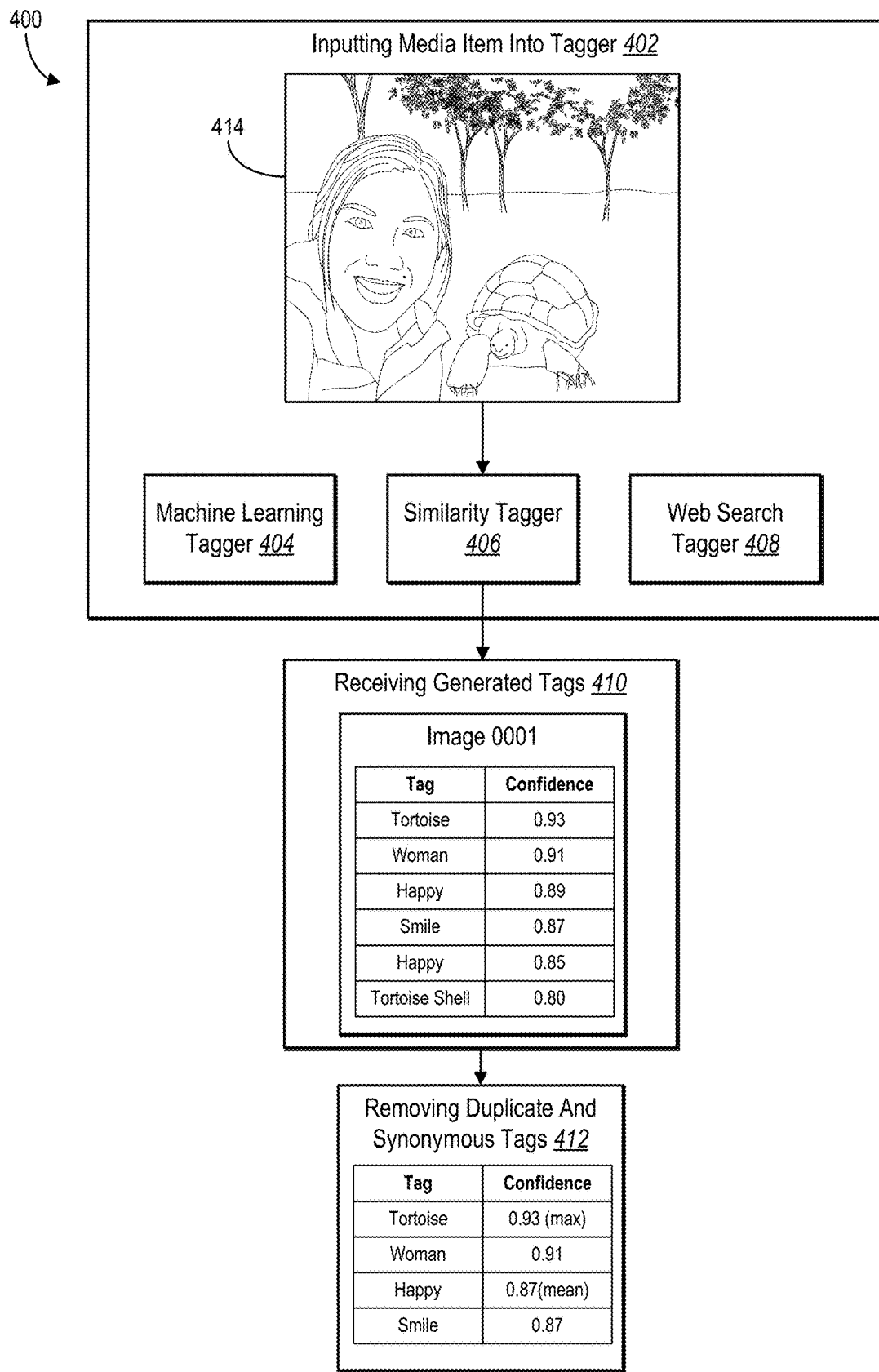
FIG. 4 illustrates an overview of a process of generating tags for a media item in accordance with one or more embodiments.

As mentioned above, the theme-based folder generation system 102 can generate tags for media items in a repository of media items. FIG. 4 provides additional detail regarding generating tags for a media item in a repository. In particular, FIG. 4 illustrates a series of acts 400 that includes the acts 402-412 of utilizing a tagger, receiving generated tags, and removing duplicate and synonymous tags. Each of these acts will be discussed in additional detail below. In alternative embodiments, one or more of acts 402-412 can be expanded, excluded, or otherwise modified.

As illustrated in FIG. 4, the series of acts 400 can include act 402 of inputting a media item 414 into a tagger. In general, the theme-based folder generation system 102 inputs a media item into a tagger to generate content-based tags for the media item. The theme-based folder generation system 102 can maintain a tag dictionary comprising known tags that are contained in the theme-based folder generation system 102. The tag dictionary can include the entire range of tags that can be generated by the tagger. The theme-based folder generation system 102 can identify a select vocabulary from which the taggers can draw tags. Thus, because clusters and themes are dependent on the vocabulary applied to the tagging, different select vocabularies can result in different organizations of the same collection of media items. In other words, the use of differing vocabularies can results in differing clusters and differing themes.

The theme-based folder generation system 102 can utilize one or more different types of taggers. In particular, and as illustrated in FIG. 4, in one or more embodiments, the theme-based folder generation system 102 can utilize three types of taggers. The theme-based folder generation system 102 can utilize a machine learning tagger 404, a similarity tagger 406, and a web search tagger 408. Each of these taggers will be described in turn.

The theme-based folder generation system 102 can utilize the machine learning tagger 404 illustrated in FIG. 4 to generate tags for a media item. In at least one embodiment, the machine learning tagger 404 comprises a trained neural network. In particular, the theme-based folder generation system 102 trains the machine learning tagger 404 using training sets of media items that are associated with training tags to train particular classes of media items. The theme-based folder generation system 102 can apply the machine learning tagger 404 to the media item 414 to generate tags for the media items. Additionally, the theme-based folder generation system 102 can use the machine learning tagger 404 to generate confidence scores associated with each generated tag. For example, during training, the theme-based folder generation system 102 can provide the machine learning tagger 404 with training sets of media items and training tags. Based on the learned classes of media items, the machine learning tagger 404 can generate tags and associated confidence scores for received media items.

In one or more embodiments, the machine learning tagger 404 comprises one of the networks disclosed in Lin et. al., U.S. Patent Pub. No. 2018/0267997, filed on Sep. 20, 2018, which is incorporated herein by reference in its entirety. In alternative embodiments, the machine learning tagger 404 comprises a classification neural network as shown and described in reference to FIG. 5.

Additionally, in at least one embodiment, the theme-based folder generation system 102 can utilize multiple machine learning taggers 404 with different tag vocabularies in parallel to generate media tags. In particular, the theme-based folder generation system 102 can deploy multiple convolutional neural networks that are independent of each other that operate using different tag vocabularies. For example, the theme-based folder generation system 102 can deploy a first machine learning tagger 404 focused on object detection and utilizing a vocabulary including the tags "ball," "dog," "man," "woman," "beach," "sun," etc. The theme-based folder generation system 102 can concurrently deploy a second photography-focused machine learning tagger 404 utilizing vocabulary including the tags "isolation," "landscape," "macro," "close-up," "depth effect," etc. Additionally, the theme-based folder generation system 102 can deploy a third machine learning tagger 404 that generate higher order tags such as "family," "picnic," "happy," "summer," etc. Thus, the theme-based folder generation system 102 can generate tags of various vocabularies by concurrently deploying independent machine learning taggers 404.

The theme-based folder generation system 102 can utilize the similarity tagger 406 illustrated in FIG. 4 to generate tags for a media item by identifying similarities between received media items and media items with known tags. The theme-based folder generation system 102 can store and/or access pre-tagged media items. In particular, using the similarity tagger 406, the theme-based folder generation system 102 can determine that the media item 414 is similar to one or more pre-tagged media item. Based on the detected similarity, the theme-based folder generation system 102 can associate tags from the pre-tagged media items similar to the media item 414 with the media item. For example, as illustrated by FIG. 4, a group of pre-tagged images might include turtles, and another group of pre-tagged images might include trees. Based on detecting similarities between the media item 414 and the groups of pre-tagged images, the theme-based folder generation system 102 can associate turtle and tree tags with the media item 414.

The similarity tagger 406 can measure various media item characteristics to determine similarity between media items of various types. In particular, the similarity tagger 406 can identify similarities in visual traits, audio traits, motion traits, text, and other traits to identify media items similar to media item 414. For example, the theme-based folder generation system 102, utilizing the similarity tagger 406, can generate feature maps for the media items with known tags. The theme-based folder generation system 102 can then associated the known tags for a given media item with the feature map for the media item to generate a tagged feature map. The theme-based folder generation system 102 can use a neural network to generate a feature map for a media item by extracting features (e.g., visual characteristics and/or latent attributes) in different levels of abstractions. Indeed, the neural network, such as a CNN, can generate feature maps for a media item by extracting features utilizing neural network layers such as, but not limited to, one or more convolution layers, one or more activation layers (e.g., ReLU layers), one or more pooling layers, and/or one or more fully connected layers.

The theme-based folder generation system 102 can also generate a feature map for the media item 414 utilizing a neural network, as described above. The theme-based folder generation system 102 can then compare the feature map for the media item 414 to the tagged feature maps. For instance, the theme-based folder generation system 102 can compare the feature map for the media item 414 to each of the tagged feature maps to identify similar tagged feature maps. For instance, the theme-based folder generation system 102 can determine distance values between the feature map for the media item 414 and each of the tagged feature maps to identify similar tagged feature maps.

In one or more embodiments, the theme-based folder generation system 102 utilizes a variety of methods to compare the feature map for the media item 414 to each of the tagged feature maps to identify the similar tagged feature maps. For example, the theme-based folder generation system 102 can utilize methods (or algorithms) such as, but not limited to, k-nearest neighbor calculations, cosine similarity calculations, clustering techniques, and/or embedding spaces to compare the feature map for the media item 414 to the tagged feature maps to identify the similar tagged feature maps. For instance, the theme-based folder generation system 102 can determine distance values (e.g., a Euclidean distance) between the feature map for the media item 414 and each of the tagged feature maps within a space (e.g., a Euclidean space). Then, the theme-based folder generation system 102 can utilize a "k" number of tagged feature maps (e.g., a number selected and/or configured by a neural network, user of the theme-based folder generation system 102, and/or the theme-based folder generation system 102) based on the determined distance values. Indeed, the theme-based folder generation system 102 can determine which tagged feature maps are similar to the feature map for the media item 414 based on the distance value (e.g., a shorter distance value can indicate a stronger similarity between the feature maps). In particular, the theme-based folder generation system 102 can utilize a threshold distance value to select the tagged feature maps (e.g., select the tagged feature maps that have a distance value that meets a threshold distance value, set by an administrator, the theme-based folder generation system 102, and/or a machine learning model, as the similar tagged feature maps).

Upon identifying one or more similar tagged feature maps, the theme-based folder generation system 102 can associate the tags corresponding the identified similar tagged feature maps with the media item 414. In particular, the theme-based folder generation system 102 can aggregate the tags corresponding to the identified tagged feature maps and assign these tags to the media item 414.

As described above, the theme-based folder generation system 102 can tag items based on web searches. As illustrated in FIG. 4, the theme-based folder generation system 102 can use the web search tagger 408 to generate tags for the media item 414 by identifying a web source of the media item 414. Based on the web source, the theme-based folder generation system 102 can use the web search tagger 408 to retrieve the metadata for the media item 414 (e.g., a title or description associated with the media item 414). The theme-based folder generation system 102 can apply tags to the media item 414 based on the retrieved metadata. For example, the web search tagger 408 can retrieve metadata that indicates that the media item 414 comprises a selfie with a turtle. Based on this determination, the theme-based folder generation system 102 can associate a turtle tag and a selfie tag with the media item 414.

The theme-based folder generation system 102 can utilize any one of the machine learning tagger 404, the similarity tagger 406, or the web search tagger 408 to generate tags for the media item 414. Additionally, the theme-based folder generation system 102 can utilize a combination of the taggers to generate tags for the media item 414.

As shown by FIG. 4, the series of acts 400 can include act 410 of receiving generated tags. In particular, the theme-based folder generation system 102 can receive generated tags from the utilized taggers. As illustrated in FIG. 4, in one or more embodiments, the tags can have associated confidence scores. For example, tags generated using the machine learning tagger 404 and the similarity tagger 406 can return with a confidence score. In one or more embodiments, a confidence score is a normalized number between 0 and 1 indicating how closely a tag corresponds to a given media item.

In act 412 of series of acts 400, the theme-based folder generation system 102 can remove duplicate and synonymous tags. In particular, the theme-based folder generation system can combine the tags from the various tagging systems (i.e., taggers) and processes the tags to remove duplicates, highly synonymous terms, and different word forms of the same term. In at least one embodiment, the theme-based folder generation system 102 implements similar term removal by using a distance computation in the word embedding vector space. In particular, the theme-based folder generation system 102 converts the tags to feature vectors. The theme-based folder generation system 102 eliminates tags associated with feature vectors that are located within a threshold distance of other feature vectors in the vector space.

When duplicates are removed, the theme-based folder generation system 102 can adjust the confidence scores. As illustrated in FIG. 4, the theme-based folder generation system 102 can adjust the confidence scores by taking the largest confidence score value or by averaging the confidence score values of the duplicates. As illustrated in FIG. 4, the theme-based folder generation system 102 receives two "Happy" tags for the media item 414. The theme-based folder generation system 102 can remove a duplicate tag and assign the mean of the two confidence scores as the new confidence score. As further illustrated, the theme-based folder generation system 102 determines that the tags "tortoise" and "tortoise shell" are similar enough to remove "tortoise shell," and assign the highest confidence score as the new confidence score.

Figure 5:
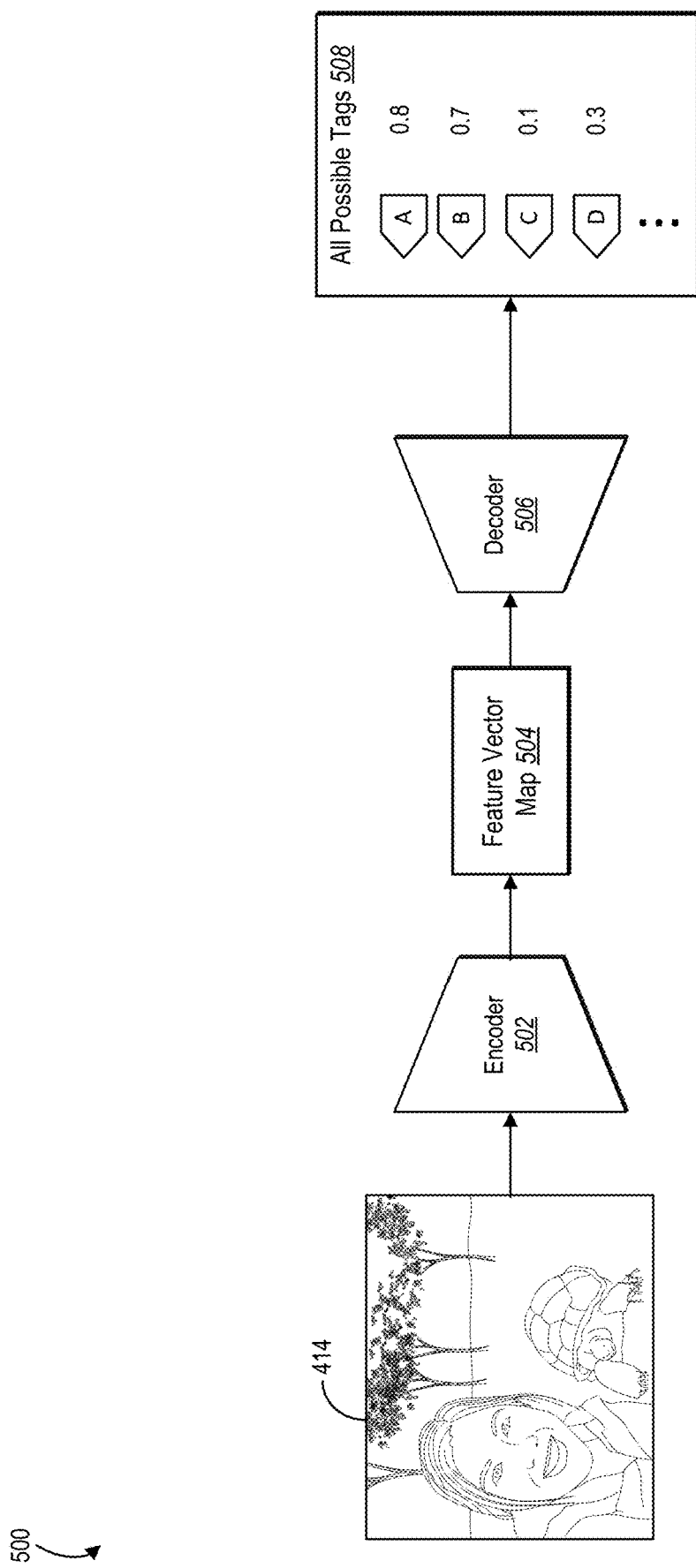
FIG. 5 illustrates an overview of a process of utilizing a neural network to generate tags and confidence scores for a media item in accordance with one or more embodiments.

As discussed above, the theme-based folder generation system 102 can use a machine learning tagger to generate tags for media items in a repository. FIG. 5 provides additional detail regarding utilizing a neural network to generate tags for a media item. In particular, the neural network 500 can comprise an encoder 502 and a decoder 506. The encoder 502 takes the media item 414 as input to generate a feature map 504. The decoder 506 illustrated in FIG. 5 decodes the feature map 504 to identify which tags 508 to associate with the media item 414. For example, as illustrated in FIG. 5, the decoder 506 identifies tags A, B, C, and D for the media item 414. In one or more embodiments, the neural network 500 is a classification deep neural network that determines a probability (e.g., confidence) that each tag of a set of tags is associated with a media item. Thus, as shown in FIG. 5, the neural network 500 can associate a confidence score with each tag. The theme-based folder generation system 102 can associate tags with the media item 414 that have confidence scores above a threshold.

Figure 6A:
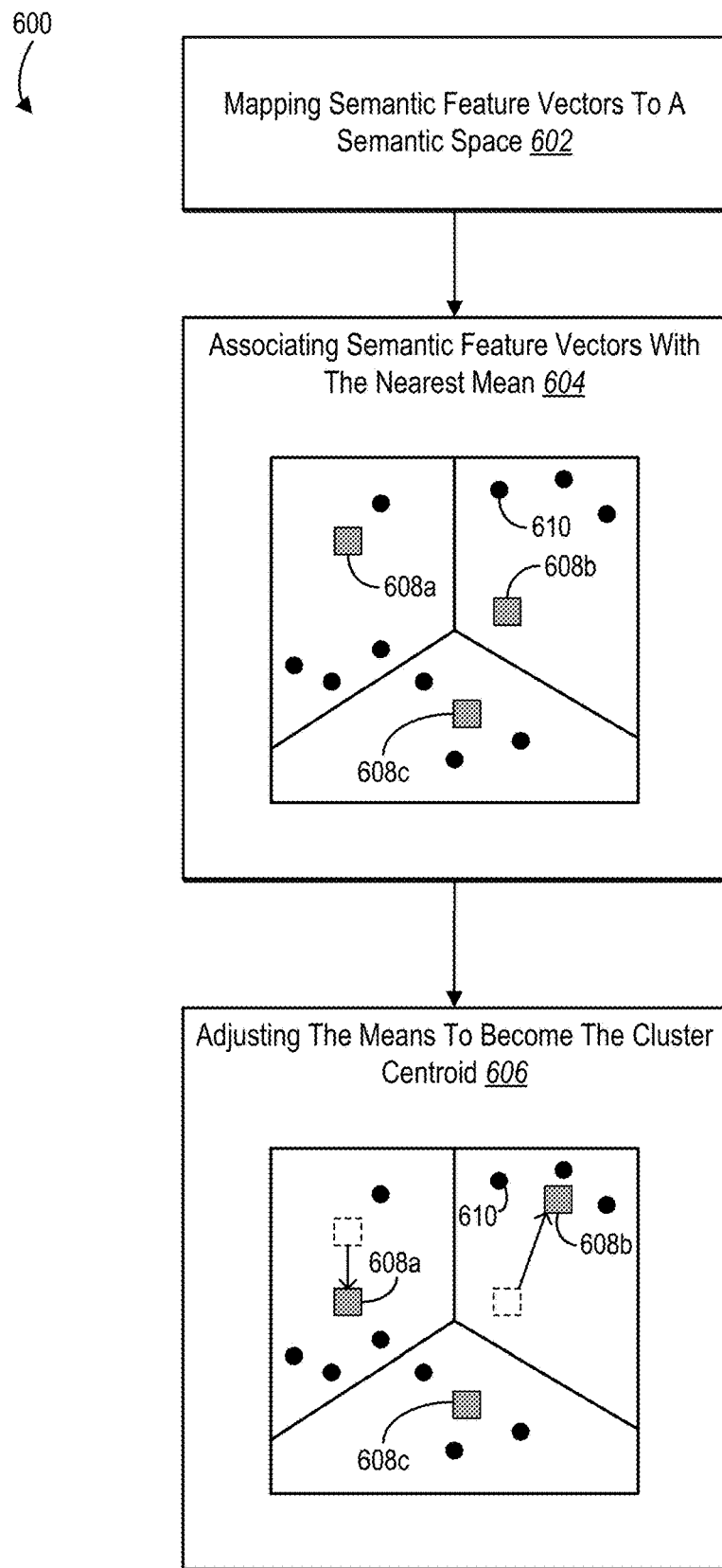
FIGS. 6A-6B illustrate an overview of a process of clustering media items using k-means clustering in accordance with one or more embodiments.
Figure 7:
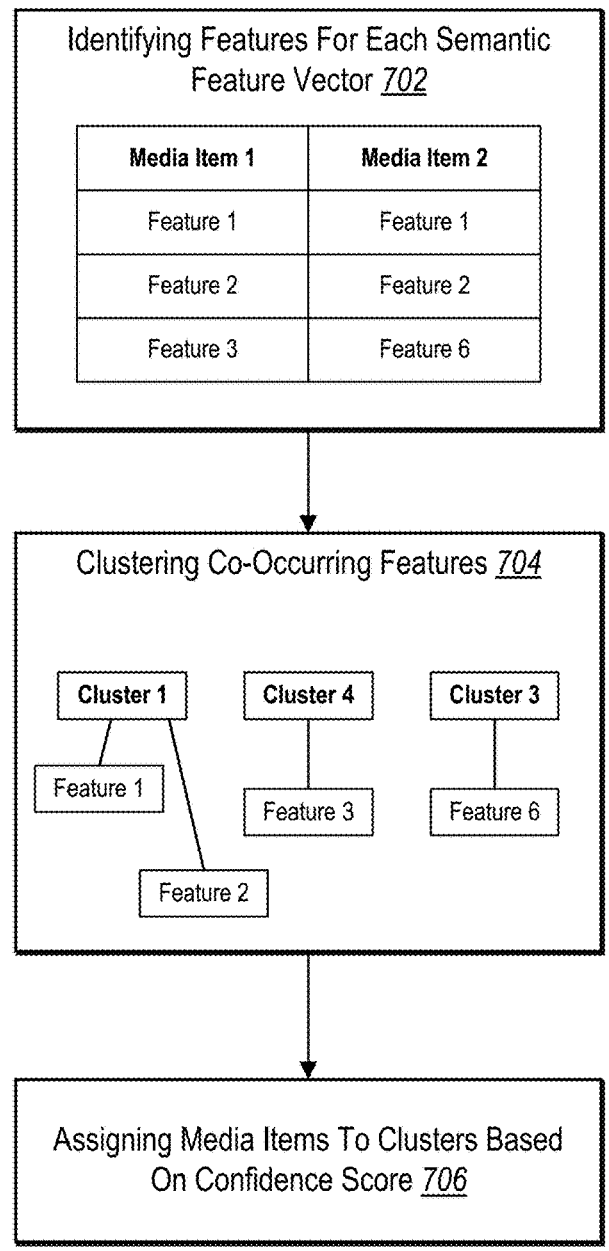
FIG. 7 illustrates an overview of a process of clustering images using Latent Dirichlet Allocation in accordance with one or more embodiments.
Figure 8:
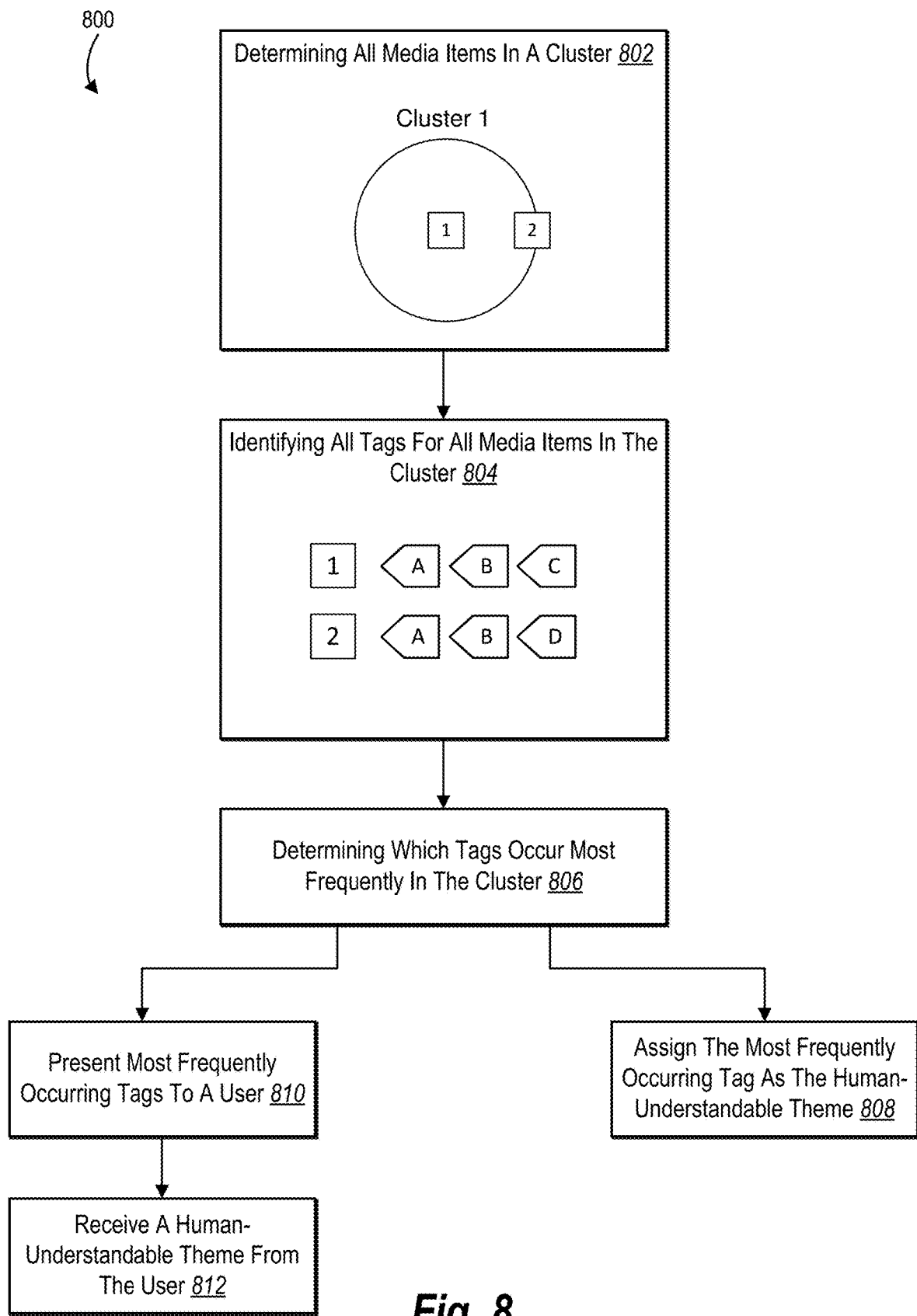
FIG. 8 illustrates an overview of a process of determining themes for clusters in accordance with one or more embodiments.

Upon generating tags for the media items, the theme-based folder generation system 102 can use the tags a part of a process of clustering the media items and determining themes for the clusters. For example, the theme-based folder generation system 102 can map the collection of media items to a semantic space based on the tags. The theme-based folder generation system 102 can then cluster the collection of media items in the semantic space to create clusters. The theme-based folder generation system 102 can then determine themes for the clusters based on the tags of the media items in the clusters. Example embodiments of mapping the collection of media items to a semantic space based on the tags is described below in reference to FIG. 6A. FIGS. 6A-7 provide example embodiments of clustering the collection of media items in the semantic space to create clusters. FIG. 8 provides an example embodiment of determining themes for the clusters based on the tags of the media items in the clusters.

Figure 6B:
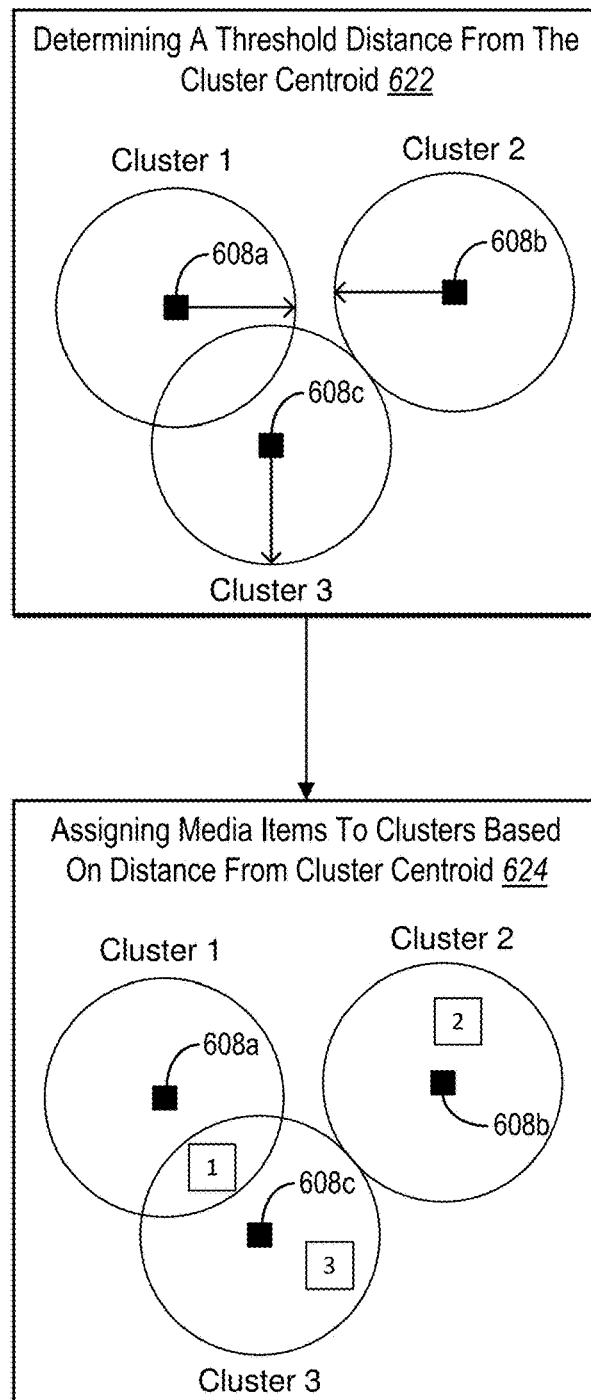

Referring now to FIGS. 6A-6B, an example implementation of organizing media items in the collection of media items by theme is provided. In particular, the theme-based folder generation system 102 can perform a series of acts 600. The series of acts 600, as shown in FIG. 6A, can include steps 602-606 of mapping media items to a semantic space, associating the semantic feature vectors with the nearest mean, and adjusting the means to become the cluster centroid. The theme-based folder generation system 102 uses k-means clustering to determine centroids or thematic feature vectors for each cluster. In alternative embodiments, the theme-based folder generation system 102 performs additional or alternative acts, or excludes one of the acts, shown in FIG. 6A.

As part of series of acts 600, the theme-based folder generation system 102 can map the media items into a semantic space 602. In general, the theme-based folder generation system 102 uses the tags associated with each media item to map the media items in the semantic space. For example, the theme-based folder generation system 102 can convert the tags associated with a media item into a semantic feature vector for the media item. As used herein, a semantic feature vector generated from tags refers to an expression or representation of a word or words in a vector space. The theme-based folder generation system 102 can convert the tags into a feature vector using a vectorization model or algorithm such as, for example, Word2Vec, GloVe, or another model. For instance, the theme-based folder generation system 102 can utilize the word to vector algorithm, "Word2vec" as described in Mikolov, Tomas; Sutskever, Ilya; Chen, Kai; Corrado, Greg S.; Dean, Jeff, Distributed Representations of Words and Phrases and Their Compositionality, NIPS 2013, the entire contents of which are hereby incorporated by reference.

In one or more embodiments, to convert the tags for a media item into a feature vector, the theme-based folder generation system 102 vectorizes each tag for the media item using a vectorization model or algorithm and concatenates the vectorized tags into a feature vector for the media item. In one or more alternative embodiments, the theme-based folder generation system 102 concatenates the tags for a media item into a sentence and then vectorizes then sentence using a vectorization model or algorithm to generate a feature vector for the media item.

Having generated feature vectors for the media items, the theme-based folder generation system 102 can cluster the feature vectors for the collection of media items in the semantic space. For example, the theme-based folder generation system 102 can utilize k-means clustering, Latent Dirichlet Allocation (LDA), or another clustering algorithm. FIGS. 6A-6B illustrate the theme-based folder generation system 102 using k-means clustering to cluster feature vectors for the media items as example clustering techniques.

As discussed above, the theme-based folder generation system 102 can utilize k-means clustering to cluster the feature vectors for the media items. As part of series of acts 600, the theme-based folder generation system 102 can associate semantic feature vectors with the nearest mean in act 604. As part of act 604, the theme-based folder generation system 102 determines a number of clusters (e.g., "k"). In at least one embodiment, the theme-based folder generation system 102 receives, from a user associated with the client device, a desired number of themes. For example, a user can indicate that a collection of media items contains a certain number of themes. In at least one other embodiment, the theme-based folder generation system 102 automatically generates a number of themes based on an optimal statistical measure.

The theme-based folder generation system 102 can generate means for the desired number of clusters using k-means clustering. The theme-based folder generation system 102 can assign each semantic feature vector within a threshold distance of the nearest mean (608a, 608b, 608c) to a cluster associated with the mean. As illustrated in FIG. 6A, the theme-based folder generation system 102 can associate semantic feature vector 610 with cluster centroid 608b.

As part of series of acts 600, the theme-based folder generation system 102 can adjust the means to become the cluster centroid as shown by act 606 of FIG. 6A. In general, a cluster centroid is a central point within a cluster. In particular, the cluster centroid is often representative of the semantic feature vectors within a cluster. In particular, the theme-based folder generation system 102 can move the nearest mean to lower the distance between the nearest mean and semantic feature vectors within the cluster. Additionally, as part of adjusting the mean to become the cluster centroid 606, the theme-based folder generation system 102 can move semantic feature vectors from one cluster to another cluster. As illustrated in FIG. 6A, the theme-based folder generation system 102 moves the cluster centroid 608b to decrease the distance between the cluster centroid 608b with the semantic feature vectors in the cluster, including the semantic feature vector 610.

In at least one embodiment, the theme-based folder generation system 102 can generate a thematic feature vector that is representative of the cluster center. In particular, the theme-based folder generation system 102 can generate the thematic feature vector to facilitate scoring semantic feature vectors to a particular cluster. The generated thematic feature vector can be a unique feature vector that is distinct from the semantic feature vectors within a cluster.

As discussed above, the theme-based folder generation system 102 can assign media items to identified clusters. FIG. 6B illustrates series of acts 620 for scoring media items to clusters. In particular, the series of acts 620 includes acts 622-624 of determining a threshold distance from the cluster centroids 622 and scoring media items to clusters based on distance from the cluster centroid 624.

As illustrated in FIG. 6B, the series of acts 620 can include the step determining a threshold distance from the cluster centroid in act 622. In general, the theme-based folder generation system 102 can receive, as input, a desired threshold distance or automatically determine an optimal threshold distance. For example, the theme-based folder generation system 102 determines threshold distances from the cluster centroids 608a, 608b, and 608c. In particular, the theme-based folder generation system 102 can determine threshold distances from the thematic feature vectors associated with the cluster centroids 608a, 608b, and 608c.

Series of acts 620 also includes the act 624 of scoring media items to clusters based on distance from the cluster centroid. In general, if a media item's semantic feature vector falls within a threshold distance from a cluster centroid, the theme-based folder generation system 102 assigns the media items to that cluster. More specifically, the theme-based folder generation system 102 assigns semantic feature vectors against the thematic feature vectors associated with the cluster centroids 608a, 608b, and 608c.

As illustrated in FIG. 6B, the theme-based folder generation system 102 can assign a media item to multiple clusters or a single cluster. In general, the theme-based folder generation system 102 can assign media items to multiple clusters if the media item is within the threshold distance of multiple cluster centroids. For example, as illustrated in FIG. 6B, the theme-based folder generation system 102 assigns media item 1 to both clusters 1 and 3 because media item 1 is within a threshold distance off both cluster centroids 608a and 608c. Additionally, as illustrated in FIG. 6B, the theme-based folder generation system 102 assigns media item 2 to a single cluster (e.g., cluster 2) based on the threshold distance.

In at least one embodiment, the theme-based folder generation system 102 constrains media items that fall within threshold distances of multiple cluster centroids to be assigned to only one best-suited cluster. In general, the theme-based folder generation system 102 can identify a best-suited cluster for a media item. In particular, the theme-based folder generation system 102 can determine to assign a media item to the nearest cluster centroid. For example, as illustrated in FIG. 6B, although media item 1 is within a threshold distance from both cluster centroids 608a and 608c, the theme-based folder generation system 102 can assign media item 1 to cluster 1 based on being closer to cluster centroid 608a than to cluster centroid 608c.

As discussed, the theme-based folder generation system 102 can utilize multiple techniques to identify clusters within the semantic space. In addition to k-means clustering, the theme-based folder generation system 102 can perform Latent Dirichlet Allocation (LDA). FIG. 7 illustrates a series of acts 700 for generating clusters using LDA. In particular, the series of acts includes acts 702-706 of identifying features for each semantic feature vector, clustering co-occurring features, and scoring media items to clusters based on confidence scores.

As illustrated in FIG. 7, the theme-based folder generation system 102 can perform act 702 of identifying features for each semantic feature vector. In general, the theme-based folder generation system 102 can parse features within the semantic feature vectors of associated with each media item. In at least one embodiment, the theme-based folder generation system 102 uses a binary system to identify features associated with each media item based on a threshold value. In particular, the theme-based folder generation system 102 can identify features with confidence scores above a particular threshold value. For example, as illustrated in FIG. 7, the theme-based folder generation system 102 associates features 1, 2 and 3 with media item 1 and features 1, 2, and 6 with media item 2. In at least one other embodiment, the theme-based folder generation system 102 can identify the features (e.g., tags) for each media item and also confidence scores associated with each feature.

As illustrated in FIG. 7, the theme-based folder generation system 102 can cluster co-occurring features 704. Again, as discussed above, the theme-based folder generation system 102 can determine the number of clusters by receiving a desired number of clusters from a user associated with a client device, or the theme-based folder generation system 102 automatically determines the number of clusters based on an optimal statistical measure. Based on the determined number of clusters, the theme-based folder generation system 102 can cluster features that frequently co-occur. For example, both media item 1 and media item 2 include both features or tags 1 and 2. The theme-based folder generation system 102 can cluster features 1 and 2 based on determining that features 1 and 2 frequently co-occur. In at least one other embodiment, the theme-based folder generation system 102 identifies other statistical measures rather than co-occurrence for clustering features.

Although not illustrated in FIG. 7, the theme-based folder generation system 102 can assign a single feature to multiple clusters. For example, although not illustrated, the theme-based folder generation system 102 can assign feature 1 to both cluster 1 and cluster 2. By assigning features to multiple clusters, the theme-based folder generation system 102 can assign media items to clusters.

As illustrated in FIG. 7, the theme-based folder generation system 102 can assign media items to clusters based on confidence scores 706. In general, the theme-based folder generation system 102 identifies confidence scores associated with each feature (e.g., tag) of each media item. If the confidence score for a feature meets a particular threshold, the theme-based folder generation system can assign the media item to a cluster including the feature. For example, the theme-based folder generation system 102 can determine that the confidence score for feature 1 of media item 1 meets a threshold. Based on this determination, the theme-based folder generation system 102 can assign media item 1 to cluster 1.

The theme-based folder generation system 102 can perform recursive clustering analyses on semantic feature vectors. In general, the theme-based folder generation system 102 can identify sub-clusters within clusters using k-means clustering or LDA as discussed with respect to FIGS. 6A-6B and FIG. 7. In at least one embodiment, the theme-based folder generation system 102 repeats the clustering analysis on multiple levels of a cluster hierarchy so that the thematic clustering is repeated on identified cluster levels. The theme-based folder generation system 102 can recursively cluster semantic feature vectors until each of the smallest sub-clusters include only a few media items.

As discussed, the theme-based folder generation system 102 can determine human-understandable themes for each cluster. In general, because clustering is done in a semantic space using semantic feature vectors, clusters may not equate to human-understandable language. Thus, the theme-based folder generation system 102 can assign human-understandable themes for each cluster. FIG. 8 illustrates series of acts 800, in one embodiment, for assigning human-understandable themes for identified clusters. In particular, FIG. 8 includes acts 802-806 of determining all media items in a cluster, identifying all tags for all media items in the cluster, and determining which tags occur most frequently in the cluster. In act 808, the theme-based folder generation system 102 can automatically determine human-understandable theme(s) by assigning the most frequently occurring tag as the human-understandable theme. Alternatively, the theme-based folder generation system 102 can present the most frequently occurring tags to a user 810 and receive a human-understandable theme from the user 812.

As illustrated in FIG. 8, the theme-based folder generation system 102 can determine or identify the media items in a cluster 802. In particular, as discussed above, the theme-based folder generation system 102 assigns media items to clusters. For example, and as illustrated in FIG. 8, the theme-based folder generation system 102 has assigned media items 1 and 2 to cluster 1.

As part of series of acts 800, the theme-based folder generation system 102 can identify tags for all media items in the cluster 804. In general, the theme-based folder generation system 102 can retrieve the generated tags for each media item. For example, the theme-based folder generation system 102 can retrieve or identify the tags associated with each of media items 1 and 2 for cluster 1.

As shown in FIG. 8, the series of acts 800 can also include act 806 of determining which tags occur most frequently in the cluster. For example, the theme-based folder generation system 102 can count the occurrences of each tag within a cluster. For example, the theme-based folder generation system 102 can determine that tags A and B occur twice and tags C and D each occur once in cluster 1 (e.g., both media 1 and 2 have tags A and B associated therewith, tag C is associated with media item 1, and tag D is associated with media item 2).

In one embodiment, the theme-based folder generation system 102 automatically generates a human-understandable theme for a cluster by assigning the most frequently occurring tag(s) as the human-understandable theme in act 808. For example, the theme-based folder generation system 102 can assign the single most frequently occurring tag as the human-understandable theme. In at least one embodiment, the theme-based folder generation system 102 can use a combination of the most frequently occurring tags as the human-understandable theme. For example, the theme-based folder generation system 102 can use the first three or five most frequently occurring tags as the human understandable theme for a cluster. The theme-based folder generation system 102 can use this technique of automatically assigning the most frequently occurring tags as the human-understandable theme can be applied to assign themes for both high-level clusters and low-level sub-clusters.

Alternatively, the theme-based folder generation system 102 can use other tag traits to automatically assign tags as the human-understandable theme. For example, for clusters generated using k-means clustering, the theme-based folder generation system 102 can rank tags based on relative distance between the semantic feature vector for the associated media item and the thematic feature vector (e.g., the cluster centroid). In particular, the theme-based folder generation system 102 can rank tags higher if they are associated with semantic feature vectors that are very close to thematic feature vectors that represent cluster centroids. Alternatively, for clusters determined using LDA, the theme-based folder generation system 102 can rank tags higher if they are associated with media items that have features with higher confidence scores.

The theme-based folder generation system 102 can also perform a manual procedure for assigning human-understandable themes for clusters. In particular, the theme-based folder generation system 102 can present the most frequently occurring tags to a user 810 and receive a human-understandable theme from the user 812. The theme-based folder generation system 102 can present the single most frequently occurring tag and/or a group of the most frequently occurring tags to a user. The theme-based folder generation system 102 repeats this process for each identified cluster. For example, based on the presented tags "sand," "summer," and "vacation," a user might assign the human-understandable theme of "beach." The theme-based folder generation system 102 stores the received human-understandable theme for future clusters including the corresponding tags.

In another embodiment, the theme-based folder generation system 102 can generate human understandable tags in a one-time operation by projecting all possible tags into a semantic vector space. The theme-based folder generation system 102 can then cluster the tags in the vector space. A user can then manually name each cluster. Then for each media cluster, the theme-based folder generation system 102 can identify the top n number of tags and the associated cluster names. Then the theme-based folder generation system 102 can identify the most frequently occurring cluster name as the human understandable tag for the media cluster.

Having assigned media items to clusters and determined themes for the clusters, the theme-based folder generation system 102 can provide a user interface to navigate or explore the media items in the themed-clusters. In particular, the theme-based folder generation system 102 can generate a media item navigation interface that presents theme-based folders that are associated with media items organized by theme. FIGS. 9A-9C illustrate a series of example graphical user interfaces. FIG. 9A illustrates a media item navigation interface that displays theme-based folders. FIG. 9B illustrates the media item navigation interface displaying theme-based sub-folders after the theme-based folder generation system 102 detects user interaction with a theme-based folder. FIG. 9C illustrates an example media item navigation interface after the theme-based folder generation system 102 receives a search term in a search query element.

As illustrated in FIG. 9A, the theme-based folder generation system 102 presents the media item navigation interface 212 via the display screen 202 of the computing device 200. As illustrated, the media item navigation interface 212 includes the theme-based folders 214 and the search query element 216.

As illustrated in FIG. 9A, the theme-based folder generation system 102 presents the theme-based folders 214. Each theme-based folder of the theme-based folders 214 corresponds to an identified cluster in the semantic space. More specifically, the theme-based folder generation system 102 associates media items assigned to a cluster with the associated theme-based folder. Additionally, each of the theme-based folders 214 is associated with a human-understandable theme. For example, the theme-based folders 214 illustrated in FIG. 9A are associated with the human-understandable themes of "Interior," "Food," "Sports," "Celebrities," "Landscape," and "Architecture." Although not displayed, the theme-based folder generation system 102 can include a broad range of additional human-understandable themes.

The media item navigation interface 212 includes interactive elements including the search query element 216 and the theme-based folders 214. In particular, the theme-based folder generation system 102 can update the media item navigation interface in response to user interaction. Based upon detecting user interaction (e.g., a user click or other selection) with a theme-based folder of the theme-based folders 214, the theme-based folder generation system 102 updates the media item navigation interface to present theme-based subfolders within the selected theme-based folder.

As discussed, the theme-based folder generation system 102 can update the media item navigation interface 212 in response to detecting user interaction with a theme-based folder of the theme-based folders 214. As illustrated in FIG. 9B, the theme-based folder generation system 102 presents the media item navigation interface 212 via the display screen 202 of the computing device 200. As illustrated, the theme-based folder generation system 102 has updated the media item navigation interface 212 to present theme-based subfolders 902.

Based on detecting user interaction with a theme-based folder of the theme-based folders 214, the theme-based folder generation system 102 presents the theme-based subfolders 902 within the theme-based folders 214. In particular, the theme-based subfolders represent sub-clusters of media items within the selected cluster of media items. For example, as illustrated in FIGS. 9A-9B, based upon detecting user selection of the food theme-based folder, the theme-based folder generation system 102 updated the media item navigation interface 212 to present the theme-based subfolders 902.

The theme-based folder generation system 102 can use various methods to order the presentation of the theme-based subfolders 902. For example, the theme-based folder generation system can present the theme-based subfolders 902 in order of decreasing number of media items. As illustrated in FIG. 9B, the theme-based folder generation system 102 might determine that the "fried" theme-based subfolder contains more media items than the "seafood" theme-based subfolder. Additionally, the theme-based folder generation system 102 can list the theme-based subfolders 902 in order of decreasing relevance. In particular, the theme-based folder generation system 102 might display theme-based subfolders that are associated with sub-clusters that are closer to the cluster centroid first. the theme-based folder generation system 102 can list theme-based subfolders that are associated with sub-clusters located a great distance from the cluster centroid later. The theme-based folder generation system 102 can list subfolders based on the theme-based subfolder human-understandable name. For example, the theme-based folder generation system 102 can list subfolders based on alphabetical order. Although not illustrated in FIG. 9B, the theme-based folder generation system 102 can receive a user selection of ordering preference. In particular, the theme-based folder generation system 102 can offer ordering options to the user, and based on user selection of an ordering preference, the theme-based folder generation system 102 can organize the theme-based subfolders.

As discussed, based upon detecting that a user has entered a search term, the theme-based folder generation system 102 can present a hybrid media item navigation interface that combines both search results and relevant theme-based folders. As illustrated in FIG. 9C, the theme-based folder generation system 102 presents a hybrid media item navigation interface 908. More particularly, the hybrid media item navigation interface 908 includes the search query element 216, result theme-based search folders 904, and result media items 906.

As illustrated in FIG. 9C, the theme-based folder generation system 102 generates the hybrid media item navigation interface 908 in response to detecting a user search term in the search query element 216. In particular, the theme-based folder generation system 102 detects that a user has input the search term "rocks" in the search query element 216. Greater detail regarding how the theme-based folder generation system 102 retrieves search results is provided in the discussion accompanying FIG. 10.

The theme-based folder generation system 102 can present the theme-based search folders 904 (e.g., abstract textured brown, sky landscape nature, and instrument musical guitar) in response to receiving a search term in the search query element 216. The theme-based search folders 904 comprise interactive elements. Thus, based upon selection of a theme-based search folders 904, the theme-based folder generation system can update the media item navigation interface to include theme-based search subfolders. Alternatively, the theme-based search folders 904 can have a single layer of depth.

More specifically, the theme-based folder generation system 102 can identify search results in response to the search query, as explained more fully below in relation to FIG. 10. The theme-based folder generation system 102 can then generate theme-based search folders 904. In particular, the theme-based search folders 904 can execute the algorithms described above in relation to FIGS. 6A-8 to cluster the tags associated with the media items determined to be results to the search query into search result clusters, assign the media items determined to be results to the search result clusters, and determine human-understandable themes for the search result clusters. As shown, by FIG. 9C, the result theme-based search folders 904 can provide greater understanding and context for the search results. Indeed, rather than mixing results having different contexts, the theme-based folder generation system 102 can group related search results together in the theme-based search folders 904, thereby allowing a user to more quickly and easily identify desired search results.

In at least one embodiment, the theme-based folder generation system 102 can include recommended search terms to assist the user to refine or expand their search. For example, the theme-based folder generation system 102 can aggregate tags associated with the media items returned in response to the search query. In particular, the theme-based folder generation system 102 aggregates tags associated with the result media items 906 and returns the most frequently occurring tags as suggested search terms. The theme-based folder generation system 102 can list the most frequent tags first in a list of suggestions to the user. The theme-based folder generation system 102 can also recommend related topics. In particular, the theme-based folder generation system 102 can identify cousin clusters (i.e., closely related clusters or clusters with the closest centroids) to suggest at the user client device. In at least one embodiment, the theme-based folder generation system 102 lists the cousin clusters in decreasing order of distance. The theme-based folder generation system can also suggest sibling clusters (i.e., cluster(s) nearest to the search term).

Additionally, the theme-based folder generation system 102 can present the result media items 906 in order of relevance. Generally, the theme-based folder generation system 102 identifies a theme-based folder that either exactly matches or is closely related to the search term. The theme-based folder generation system 102 can display media items from the identified theme-based folder and orders the media items by relevance. Additionally, and as illustrated in FIG. 9C, the theme-based folder generation system 102 can display a confidence score (e.g., 74%, 70%, 68%, etc.) for each of the result media items 906.

In at least one embodiment, the theme-based folder generation system 102 can customize the order in which result media items 906 are displayed in the media item navigation interface 212. The theme-based folder generation system 102 can customize the order of result media items 906 based on analytics data including viewership and usage. For instance, the theme-based folder generation system 102 can present theme-based folders based on viewership where the most frequently viewed media items are listed first. The theme-based folder generation system 102 can also reorder media items based on usage manner so that a user can quickly identify media items that the user has not used before.

As discussed, the theme-based folder generation system 102 can display theme-based folder and media item results based on search term inputs. FIG. 10 illustrates series of acts 1000 to implement the theme-based search function. FIG. 10 illustrates how the theme-based folder generation system 102 can determine which media items to display in response to receiving a search term input. In particular, the series of acts 1000 include acts 1002-1014 of generating a reverse index, receiving a search term, looking up the search term in the reverse index, and determining if an exact match is found.

The series of acts 1000 includes the act 1002 of generating a reverse index. The theme-based folder generation system 102 can create the reverse index when the theme-based folder generation system 102 associates tags with the media items. The theme-based folder generation system 102 can de-duplicate, stem, root, and correct the tags for typos before storing them in the reverse index. As illustrated in FIG. 10, the main entries in the reverse index comprise the tags assigned to media items. For each tag, the reverse index records associated media items. In embodiments where the theme-based folder generation system 102 generates confidence scores in addition to tags, the theme-based folder generation system 102 stores the confidence scores in the reverse index. For example, and as illustrated in FIG. 10, the reverse index can include entries for the tags "Happy." The theme-based folder generation system 102 records all media items that are associated with the tag "Happy" and the corresponding confidence scores.

The series of acts 1000 includes act 1004 of receiving a search term. The theme-based folder generation system 102 can receive a search term from the user client device associated with the user. For example, a user associated with a computing device can enter a search term. Although in some instances, the search term may match tags in the reverse index, in other instances, the search term may not match any tag in the reverse index. In at least one embodiment, the theme-based folder generation system 102 can receive search terms of various input modalities. For example, search terms can include text entered into the search query element 216. In other embodiments, the theme-based folder generation system 102 can receive voice input via a microphone and/or touch and gestures via an interactive touch screen.

In at least one embodiment, the theme-based folder generation system 102 can receive other inputs beside text as a search term. In particular, the theme-based folder generation system 102 can receive a set of model media items in lieu of a natural language search term. For instance, if a user would like to view media items that are semantically similar to a set of model media items (e.g., a favorite photos folder, a favorite music folder), theme-based folder generation system 102 can receive, as input, the set of model media items. The theme-based folder generation system 102 can generate tags for the set of model media items and use the generated tags as search terms.

The series of acts 1000 includes act 1006 of looking up the search term in the reverse index. In particular, the theme-based folder generation system 102 searches tag entries in the reverse index for the search term. The theme-based folder generation system 102 determines if an exact match is found in act 1008.

When the theme-based folder generation system 102 identifies an entry in the reverse index that is an exact match for the search term, the theme-based folder generation system 102 performs act 1010 of displaying results in descending order of confidence. For example, if the theme-based folder generation system 102 receives the search term "happy," and locates the exact tag "happy" in the reverse index, the theme-based folder generation system 102 will display all results that are referenced in the reverse index. In particular, the theme-based folder generation system 102 orders the media items based on the confidence scores associated with the tags at the time of tagging the media item.

Figure 10:
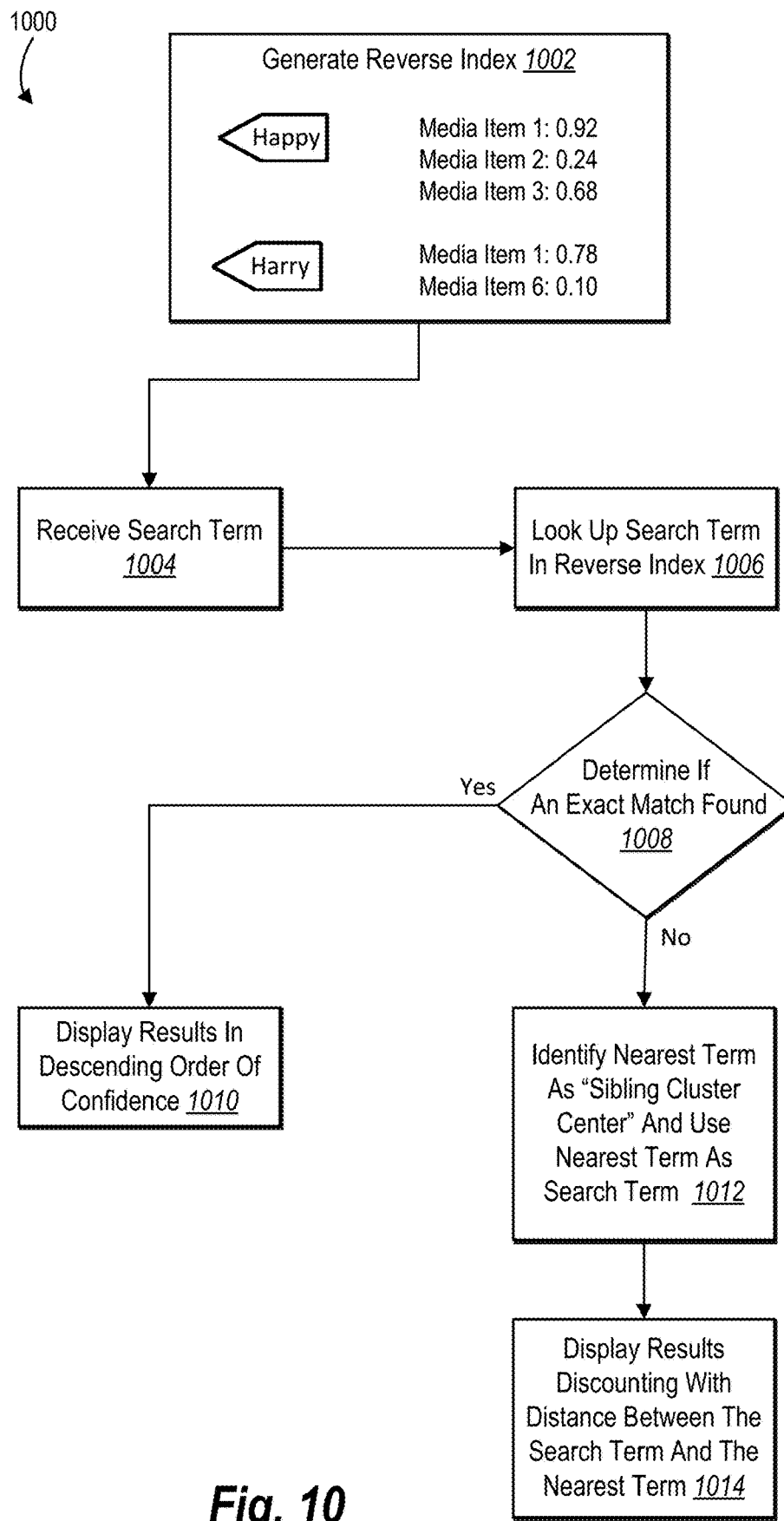
FIG. 10 illustrates an overview of a process of displaying search results organized by themes based on a received search term in accordance with one or more embodiments.

As illustrated in FIG. 10, when the theme-based folder generation system 102 cannot find an exact match for the search term in the reverse index, the theme-based folder generation system 102 can perform act 1012 of identifying the nearest term as a sibling cluster center and using the sibling cluster center as the search term. In at least one embodiment, the theme-based folder generation system 102 searches the reverse index using cousin cluster centers. Cousin cluster centers are related to the search term but to varying degrees.

When the theme-based folder generation system 102 uses a sibling cluster center or a cousin cluster center as the search term, the theme-based folder generation system can perform act 1014 of displaying results discounting with the distance between the search term and the nearest term. In particular, the theme-based folder generation system 102 can discount the reverse index search results with the distance between the selected sibling cluster center or cousin cluster center and the reverse index tag entries. Based on discounting the distance, the theme-based folder generation system 102 ranks results in descending order.

The theme-based folder generation system 102 can also generate relevant theme-based folders in response to multiple search terms. In at least one embodiment, the theme-based folder generation system 102 can intersect individual results from each search term. In particular, the theme-based folder generation system 102 can present search results including media items that present with each search term. For example, as illustrated in FIG. 10, if the user inputs both of the search terms "Happy" and "Harry," the theme-based folder generation system 102 can identify media items that appear for both search terms. For example, the theme-based folder generation system 102 might return media item 1 as a search result because media item 1 is associated with both search terms "Happy" and "Harry." The theme-based folder generation system 102 can combine confidence scores by adding them. For example, if the results from two search terms include the same media item, the theme-based folder generation system 102 can generate a new confidence score by adding the confidence scores for media item for each search term. The theme-based folder generation system 102 can arbitrarily extend a search to as many terms as needed.

In at least one embodiment, the theme-based folder generation system 102 can support searches using search terms of various languages. For example, the theme-based folder generation system 102 can receive a search term in any language. Based on determining that the received search term is in an original language that differs from the common language of the tags (e.g., English), the theme-based folder generation system 102 can utilize a translator system to translate the search term into the common language of the tags. The theme-based folder generation system 102 can look up the translated search term in the reverse index. Additionally, the theme-based folder generation system 102 can utilize the same or an additional translator system to translate the results from the common language of the tags to the original language of the search term. Thus, the theme-based folder generation system 102 presents the results to the user in the original search term language.

Figure 11:
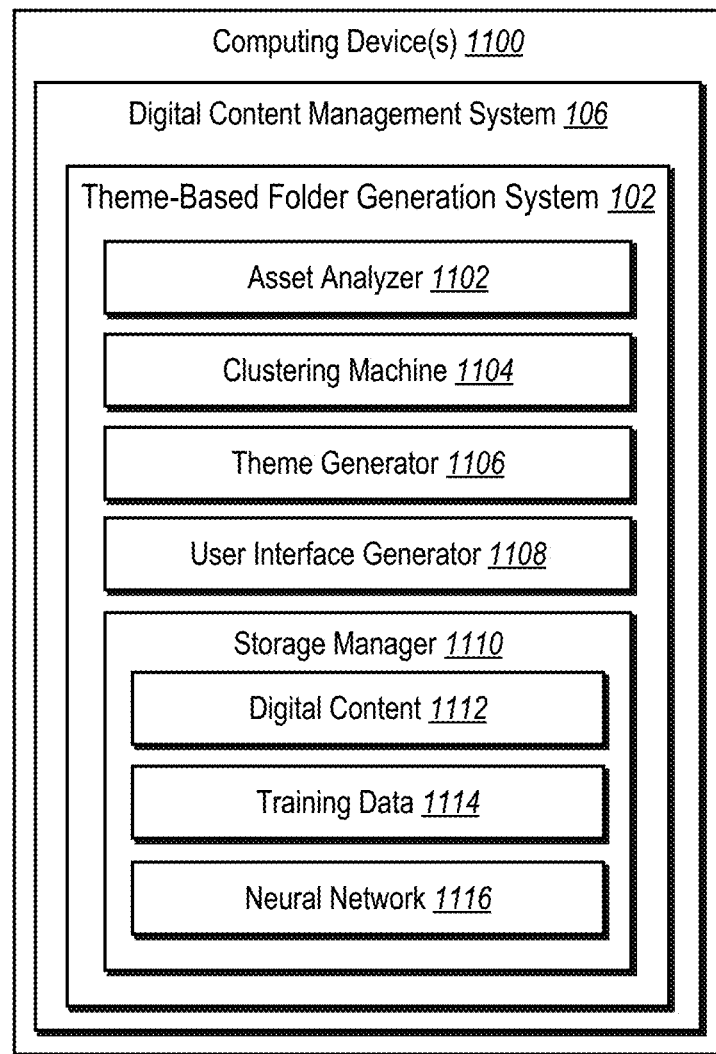
FIG. 11 illustrates a schematic diagram of an example architecture of a theme-based folder generation system in accordance with one or more embodiments.

Additional detail will be provided regarding components and capabilities of the theme-based folder generation system 102 in FIG. 11. Specifically, FIG. 11 illustrates an example schematic diagram of the theme-based folder generation system 102 on an example computing device 1100 (e.g., one or more of the user client device 108 and the server device(s) 104). As shown in FIG. 11, the theme-based folder generation system 102 may include an asset analyzer 1102, a clustering machine 1104, a theme generator 1106, a user interface generator 1108, and a storage manager 1110.

As mentioned, the theme-based folder generation system 102 can include the asset analyzer 1102. Generally, the asset analyzer 1102 can analyze media items in a collection of media items to generate tags for the media items. In particular, the asset analyzer 1102 can manage, train, utilize, implement, or apply a collection of taggers to generate content-based tags for media items. For example, the asset analyzer 1102 can manage a machine learning tagger that utilizes a neural network, a similarity tagger, and a web search tagger. To illustrate, the asset analyzer 1102 can train a neural network to analyze a media item and to determine content-based tags and confidence scores for media items in a collection of media items in accordance with the disclosure herein.

In addition, the theme-based folder generation system 102 can include the clustering machine 1104. Generally, the clustering machine 1104 maps semantic feature vectors to a semantic space and performs clustering analyses to identify clusters of semantic feature vectors. More specifically, the clustering machine 1104 can utilize k-means clustering or LDA to determine clusters of semantic feature vectors. Additionally, the clustering machine 1104 assigns media items to clusters.

The theme-based folder generation system 102 can include the theme generator 1106. The theme generator 1106 can assign human-understandable themes to the identified clusters. In particular, the theme generator 1106 can perform a voting procedure to extract a human-understandable theme for each cluster. For example, the theme generator 1106 can identify all tags for media items within a cluster, and using the most frequently occurring tags, determine a human-understandable theme for the cluster.

The theme-based folder generation system 102 can also include the user interface generator 1108. The user interface generator 1108 creates and manages the media item navigation graphical user interface. Additionally, the user interface generator 1108 receives and manages user interaction with the media item navigation graphical user interface. In particular, the user interface generator 1108 creates the media item navigation graphical user interface that comprises a theme-based folder structure display comprising the media items organized by cluster with associated human-understandable themes. Additionally, the user interface generator 1108 can present a search query element and manage received search terms.

The theme-based folder generation system 102 can include the storage manager 1110. The storage manager 1110 can communicate with one or more of the asset analyzer 1102, the clustering machine 1104, the theme generator 1106, and the user interface generator 1108 to provide, store, manage, or maintain relevant data. For example, the storage manager 1110 can store data associated with media items including tags, semantic feature vectors, clusters, and human-understandable themes. Additionally, the storage manager 1110 can store data relevant to the neural networks utilized to generate tags for the media items.

The storage manager 1110 can store digital content 1112, training data 1114, and a neural network 1116. The digital content 1112 includes digital media items and relevant data associated with the digital media items. In particular the digital content 1112 includes metadata, tags, semantic feature vectors, clusters, and human-understandable themes associated with the media items. Additionally, the digital content 1112 includes databases such as tag dictionaries and a reverse index.

The training data 1114 comprises training data utilized to train the neural networks used by the machine learning tagger. In particular, the training data 1114 includes training media items and tags for each training media item.

The storage manager 1110 can include the neural network 1116. Generally, the neural network 1116 uses an encoder, feature map, and a decoder to generate tags and associated confidence scores for media items within a collection. The neural network 1116 receives media items as input and uses the input to generate tags and associated confidence scores.

As illustrated, the theme-based folder generation system 102 and its constituent components can be included in digital content management system 106. In particular, the content management system 106 can include a digital content repository, a digital content campaign system, or a media item distribution system.

In one or more embodiments, each of the components of the theme-based folder generation system 102 are in communication with one another using any suitable communication technologies. Additionally, the components of the theme-based folder generation system 102 can be in communication with one or more other devices including one or more user client devices described above. It will be recognized that although the components of the digital content management system 106 are shown to be separate in FIG. 11, any of the subcomponents may be combined into fewer components, such as into a single component, or divided into more components as may serve a particular implementation. Furthermore, although the components of FIG. 11 are described in connection with the theme-based folder generation system 102, at least some of the components for performing operations in conjunction with the theme-based folder generation system 102 described herein may be implemented on other devices within the environment.

The components of the theme-based folder generation system 102 can include software, hardware, or both. For example, the components of the theme-based folder generation system 102 can include one or more instructions stored on a computer-readable storage medium and executable by processors of one or more computing devices (e.g., the computing device 1100 or the computing device 1300 of FIG. 13). When executed by the one or more processors, the computer-executable instructions of the theme-based folder generation system 102 can cause the computing device 1100 to perform the methods described herein. Alternatively, the components of the theme-based folder generation system 102 can comprise hardware, such as a special purpose processing device to perform a certain function or group of functions. Additionally or alternatively, the components of the theme-based folder generation system 102 can include a combination of computer-executable instructions and hardware.

Furthermore, the components of the theme-based folder generation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the theme-based folder generation system 102 may be implemented as part of a stand-alone application on a personal computing device or a mobile device. Alternatively or additionally, the components of the theme-based folder generation system 102 may be implemented in any application that allows creation, storage, and delivery of digital content to users, including, but not limited to, applications in ADOBE CREATIVE CLOUD® and/or ADOBE® MARKETING CLOUD, such as ADOBE® TARGET, ADOBE® CAMPAIGN, ADOBE® ANALYTICS, and ADOBE® MEDIA OPTIMIZER. "ADOBE," "CREATIVE CLOUD," "ADOBE MARKETING CLOUD," "ADOBE CAMPAIGN," "ADOBE ANALYTICS," and "ADOBE MEDIA OPTIMIZER," are registered trademarks of Adobe Systems Incorporated in the United States and/or other countries.

FIGS. 1-11, the corresponding text, and the examples provide a number of different systems, methods, and non-transitory computer readable media for generating and providing theme-based folders. In addition to the foregoing, embodiments can also be described in terms of flowcharts comprising acts for accomplishing a particular result. For example, FIG. 12 illustrates a flowchart of an example sequence of acts in accordance with one or more embodiments.

Figure 12:
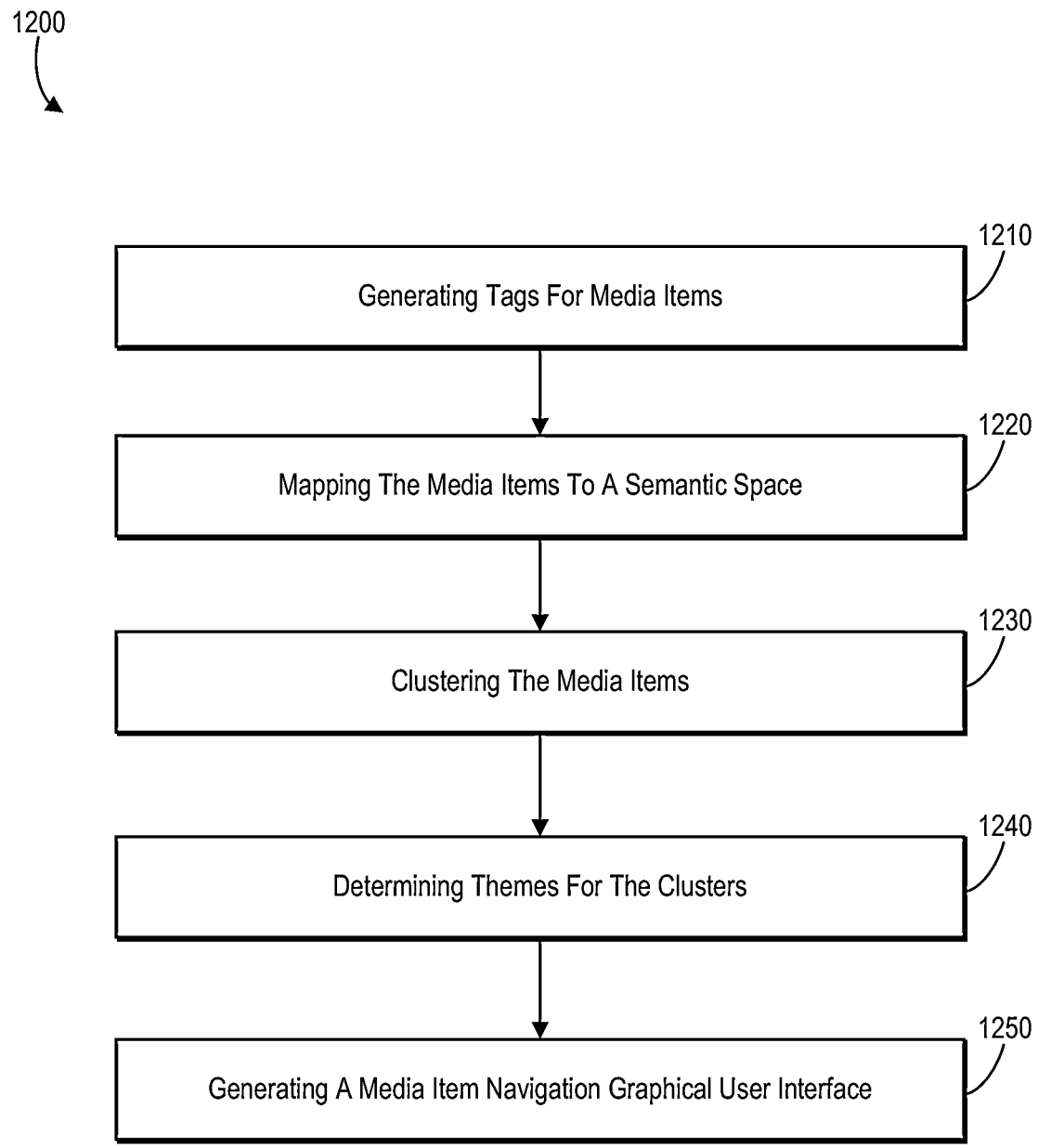
FIG. 12 illustrates a series of acts for generating a graphical user interface in which media items are organized in theme-based folders in accordance with one or more embodiments.

While FIG. 12 illustrates acts according to one embodiment, alternative embodiments may omit, add to, reorder and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12. Additionally, the acts described herein may be repeated or performed in parallel with one another or in parallel with different instances of the same or other similar acts.

FIG. 12 illustrates an example of series of acts 1200 of generating a media item navigation graphical user interface. In particular, the series of acts 1200 can include an act 1210 of generating tags for media items. For example, act 1210 can involve generating tags for media items in a collection of media items. In one or more embodiments act 1210 can involve generating, utilizing a neural network, a feature map for a media item and identifying, utilizing the neural network, one or more tags for the media item based on the feature map. Act 1210 can also involve generating confidence scores for each tag—media item combination.

The series of acts 1200 can further include an act 1220 of mapping the media items to a semantic space. In particular, the act 1220 can involve mapping the collection of media items to a semantic space based on the tags. For example, act 1220 can involve, for a given media item, converting one or more tags associated with the given media item into a semantic feature vector using a word to vector algorithm.

The series of acts 1200 can also include an act 1230 of clustering the media items. In particular, the act 1230 can include clustering the collection of media items in the semantic space to create clusters. Additionally, the act 1230 can include an act of clustering the collection of media items in the semantic space by using K-means clustering on the semantic feature vectors. The act 1230 can also include an act of clustering the collection of media items in the semantic space by processing the collection of media items using Latent Dirichlet Allocation. Additionally, the act 1230 can also include identifying cluster centers in the semantic space for the clusters; determining distances between the cluster centers and the semantic feature vectors; determining that a distance between a cluster center and a set of semantic feature vectors falls below a threshold; and scoring the set of semantic feature vectors to the cluster.

The series of acts 1200 can further include an act 1240 of determining themes for the clusters. In particular, act 1240 can include determining themes for the clusters based on the tags of the media items in the clusters. The act 1240 can involve determining themes for the clusters by: identifying cluster tags for media items associated with the set of semantic feature vectors in the cluster; determining a number of times each tag of the cluster tags is in the cluster; identifying a most frequently occurring tag in the cluster; and associating a human-understandable name associated with the most frequently occurring tag as the theme.

The series of acts 1200 can also include an act 1250 of generating a media item navigation graphical user interface. The act 1250 can further include generating a media item navigation graphical user interface comprising the collection of media items organized by themes. In particular, act 1250 can involve generating a folder for each cluster of media items and associating a determined theme with the each cluster.

The series of acts 1200 can also involve determining confidence scores for tags associated with a given media item that indicate how strongly a given tag corresponds to the given media item. The series of acts 1200 can also involve generating a reverse index that maps the tags to associated media items with associated confidence scores. The series of acts 1200 can further involve receiving a search query, determining if the search query is in the reverse index, and based on determining that search query is in the reverse index, provide the media items associated with the search query in the reverse index in descending order based on the associated confidence scores. Alternatively, the series of acts 1200 can involve determining if the search query is in the reverse index; based on determining that search query is not in the reverse index, determining a nearest term to the search query; and providing the media items associated with the nearest term in descending order based on the associated confidence scores. The series of acts 1200 can also involve suggesting additional query terms by suggesting one or more tags more frequently associated with the media items associated with the nearest term. Still further the series of acts 1200 can involve providing the media items associated with the search query in themed-based search folders.

In addition (or in the alternative) to the acts described above, in some embodiments, the acts 1200 include a step for organizing the media items in the collection of media items by theme. For example, the acts and described in reference to FIGS. 6A-6B and FIGS. 7-8 can comprise the corresponding acts (or structure) for performing a step for organizing the media items in the collection of media items by theme.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
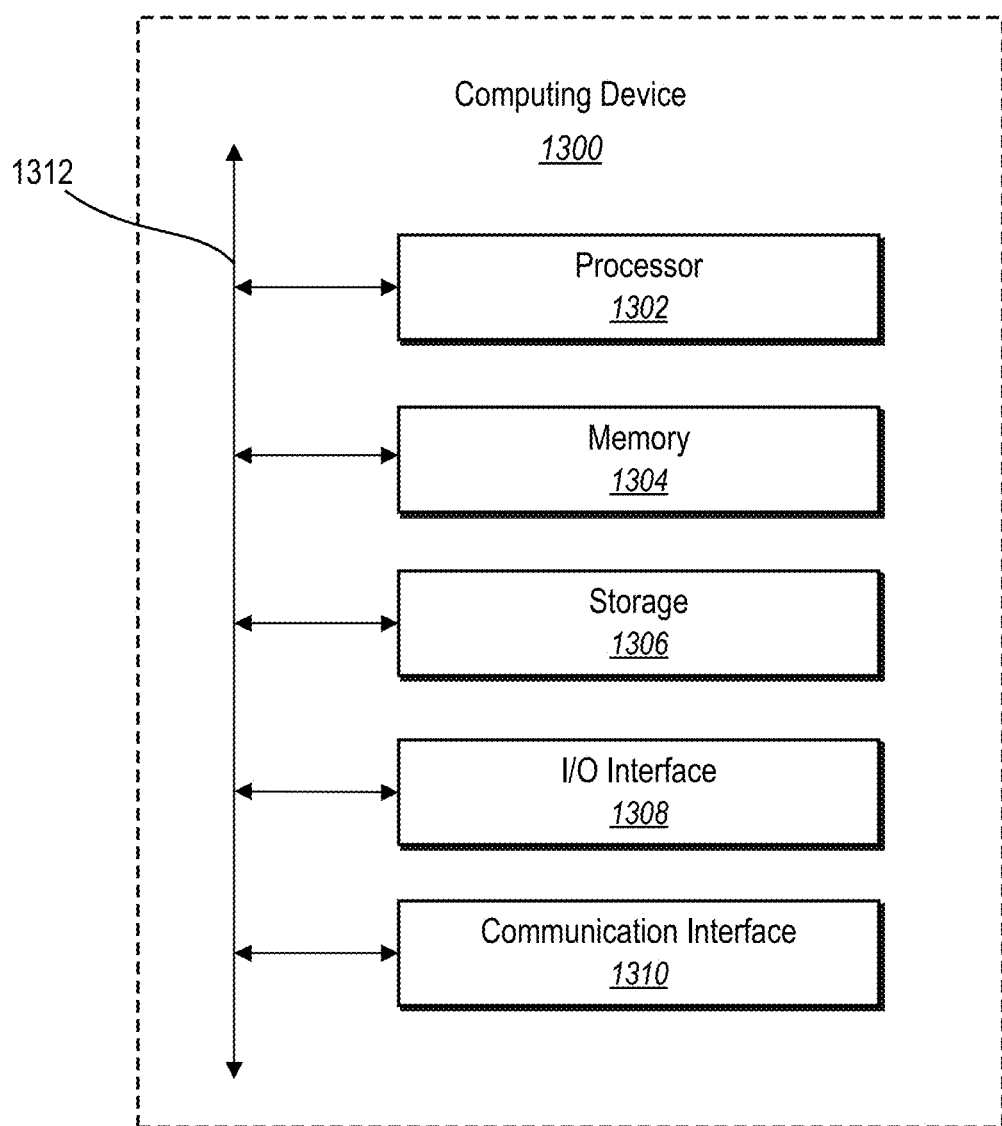
FIG. 13 illustrates a block diagram of an example computing device in accordance with one or more embodiments.

FIG. 13 illustrates, in block diagram form, an example computing device 1300 (e.g., computing device 1100, user client device 108, and/or server device(s) 104) that may be configured to perform one or more of the processes described above. One will appreciate that the theme-based folder generation system 102 can comprise implementations of the computing device 1300. As shown by FIG. 13, the computing device can comprise a processor 1302, memory 1304, a storage device 1306, an I/O interface 1308, and a communication interface 1310. Furthermore, the computing device 1300 can include an input device such as a touchscreen, mouse, keyboard, etc. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a writing device or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause at least one processor to:
    generate tags for digital images in a collection of digital images;
    map the collection of digital images to a semantic space based on the tags by converting tags associated with a given digital image into a semantic feature vector using a word to vector algorithm;
    cluster the collection of digital images in the semantic space to create clusters;
    generate themes for the clusters based on determining most frequently occurring tags of the digital images in the clusters; and
    generate a digital image navigation graphical user interface comprising the collection of digital images organized in folders according to the themes.

2. The non-transitory computer readable medium of claim 1, wherein the instructions, when executed by the at least one processor, cause the at least one processor to generate the tags for the digital images in the collection of digital images by:
    generating, utilizing a neural network, a feature map for a digital image; and
    identifying, utilizing the neural network, one or more tags for the digital image based on the feature map.

3. The non-transitory computer readable medium of claim 2, further comprising instructions that when executed by the at least one processor, cause the at least one processor to generate confidence scores for each tag and digital image combination.

4. The non-transitory computer readable medium of claim 3, wherein the instructions, when executed by the at least one processor, cause the at least one processor to associate a tag with a digital image when a corresponding confidence score is above a threshold.

5. The non-transitory computer readable medium of claim 1, wherein the instructions, when executed by the at least one processor, cause the at least one processor to cluster the collection of digital images in the semantic space by using K-means clustering on semantic feature vectors associated with the collection of digital images.

6. The non-transitory computer readable medium of claim 1, wherein the instructions, when executed by the at least one processor, cause the at least one processor to cluster the collection of digital images in the semantic space by processing the collection of digital images using Latent Dirichlet Allocation.

7. The non-transitory computer readable medium of claim 1, wherein the instructions, when executed by the at least one processor, cause the at least one processor to cluster the collection of digital images in the semantic space by:
    identifying cluster centers for the clusters in the semantic space;
    determining distances between the cluster centers and semantic feature vectors associated with the collection of digital images;
    determining that a distance between a cluster center and a set of semantic feature vectors falls below a threshold; and
    assigning digital images associated with set of semantic feature vectors to a cluster.

8. The non-transitory computer readable medium of claim 7, further comprising instructions that, when executed by the at least one processor, cause the at least one processor to generate themes for the clusters by:
    identifying cluster tags for digital images associated with the set of semantic feature vectors in the cluster;
    determining a number of times each tag of the cluster tags is in the cluster;
    identifying a most frequently occurring tag in the cluster; and
    associating a human-understandable name associated with the most frequently occurring tag as a theme for the cluster.

9. A system comprising:
    a computer readable storage medium storing a collection of digital images; and
    at least one processor configured to:
        generate tags and confidence scores for digital images in a collection of digital images utilizing a neural network, wherein the confidence scores indicate how strongly a given tag corresponds to a given digital image;
        map the collection of digital images to a semantic space based on the tags by generating semantic feature vectors for the digital images of the collection of digital images from the tags using a word to vector algorithm;

cluster the collection of digital images in the semantic space to create clusters by grouping similar semantic feature vectors;

assign the digital images of the collection of digital images to the clusters;

generate themes for the clusters based on determining most frequently occurring tags of the digital images in the clusters; and generate a digital image navigation graphical user interface comprising the collection of digital images organized in folders according to the themes.

10. The system of claim 9, wherein the at least one processor is further configured to cause the system to generate the themes for the clusters by:

identifying cluster digital images associated with a set of semantic feature vectors within a cluster of the clusters;

identifying cluster tags for the cluster digital images;

determining a number of times each tag of the cluster tags is in the cluster;

identifying a most frequently occurring tag in the cluster; and associating a human-understandable name associated with the most frequently occurring tag as a theme for the cluster.

11. The system of claim 9, wherein the at least one processor is further configured to cause the system to:

generate a reverse index that maps the tags to associated digital images with associated confidence scores;

receive, via a search query element in the digital image navigation graphical user interface, a set of model digital images, wherein a search query comprises the set of model digital images;

determine digital images associated with the search query in the reverse index by:

generating, utilizing a neural network, tags for the set of model digital images; and determining digital images associated with the tags for the set of model digital images; and provide, for display via the digital image navigation graphical user interface, the digital images associated with the search query.

12. The system of claim 11, wherein the at least one processor is further configured to cause the system to provide the digital images associated with the search query by:

determining if the search query is in the reverse index; and based on determining that search query is in the reverse index, providing the digital images associated with the search query in the reverse index in descending order based on the associated confidence scores.

13. The system of claim 11, wherein the at least one processor is further configured to cause the system to provide the digital images associated with the search query by:

determining if the search query is in the reverse index;

based on determining that search query is not in the reverse index, determining a nearest term to the search query; and providing the digital images associated with the nearest term in descending order based on the associated confidence scores.

14. The system of claim 11, wherein the at least one processor is further configured to cause the system to suggest additional query terms by suggesting one or more tags more frequently associated with the digital images associated with a nearest term.

15. A computer-implemented method comprising:

generating tags for digital images in a collection of digital images;

mapping the collection of digital images to a semantic space based on the tags by converting tags associated with a given digital image into a semantic feature vector using a word to vector algorithm;

clustering the collection of digital images in the semantic space to create clusters;

generating themes for the clusters based on determining most frequently occurring tags of the digital images in the clusters; and generating a digital image navigation graphical user interface comprising the collection of digital images organized in theme-based folders according to the themes.

16. The computer-implemented method of claim 15, further comprising:

receiving a selection of a theme-based folder; and organizing a subset of the digital images in the collection of digital images associated with the theme-based folder in a plurality of theme-based subfolders.

17. The computer-implemented method of claim 16, wherein organizing the digital images in the collection of digital images in theme-based folders is performed without modifying an existing folder structure in which the collection of digital images are stored.

18. The computer-implemented method of claim 16, further comprising updating the clusters and the theme-based folders upon addition of additional digital images to the collection of digital images.

19. The computer-implemented method of claim 15, wherein clustering the collection of digital images in the semantic space comprises:

identifying cluster centers for the clusters in the semantic space;

determining distances between the cluster centers and semantic feature vectors associated with the collection of digital images;

determining that a distance between a cluster center and a set of semantic feature vectors falls below a threshold; and assigning digital images associated with set of semantic feature vectors to a cluster.

20. The computer-implemented method of claim 19, wherein generating themes for the clusters comprises:

identifying cluster tags for digital images associated with the set of semantic feature vectors in the cluster;

determining a number of times each tag of the cluster tags is in the cluster;

identifying a most frequently occurring tag in the cluster; and associating a human-understandable name associated with the most frequently occurring tag as a theme.

\* \* \* \* \*